US010051011B2

(12) United States Patent
Boerjesson et al.

(10) Patent No.: US 10,051,011 B2
(45) Date of Patent: *Aug. 14, 2018

(54) SYSTEM AND METHOD FOR INTEGRATING SESSION INITIATION PROTOCOL COMMUNICATION IN A TELECOMMUNICATIONS PLATFORM

(71) Applicant: Twilio, Inc., San Francisco, CA (US)

(72) Inventors: Jonas Boerjesson, San Francisco, CA (US); John Wolthuis, San Francisco, CA (US); Jeffrey Lawson, San Francisco, CA (US); Evan Cooke, San Francisco, CA (US)

(*) Notice: Subject to any disclaimer, the term of this patent is extended or adjusted under 35 U.S.C. 154(b) by 359 days.

This patent is subject to a terminal disclaimer.

(21) Appl. No.: 15/005,190

(22) Filed: Jan. 25, 2016

(65) Prior Publication Data
US 2016/0142446 A1    May 19, 2016

Related U.S. Application Data

(63) Continuation of application No. 14/208,920, filed on Mar. 13, 2014, now Pat. No. 9,282,124.
(Continued)

(51) Int. Cl.
*G06F 15/16* (2006.01)
*H04L 29/06* (2006.01)
(Continued)

(52) U.S. Cl.
CPC ........ *H04L 65/1006* (2013.01); *H04L 61/106* (2013.01); *H04L 65/105* (2013.01);
(Continued)

(58) Field of Classification Search
CPC ... H04L 61/106; H04L 65/1069; H04L 67/14; H04L 29/06278; H04L 65/1013;
(Continued)

(56) References Cited

U.S. PATENT DOCUMENTS 5,274,700 A    12/1993    Gechter et al.
5,526,416 A    6/1996     Dezonno et al.
(Continued)

FOREIGN PATENT DOCUMENTS

DE    1684587 A    3/1971
EP    3282126 A    9/1988
(Continued)

OTHER PUBLICATIONS

Abu-Lebdeh et al. "A 3GPP Evolved Packet Core-Based Architecture for QoS-Enabled Mobile Video Surveillance Applications". 2012 Third International Conference on the Network of the Future (NOF). Nov. 21-23, 2012. pp. 1-6.
(Continued)

*Primary Examiner* — Oleg Survillo

(57) ABSTRACT

A system and method for facilitating signaling and media communication at a communication platform that includes receiving a communication request to a resource, wherein the communication request specifies a destination endpoint; establishing signaling and media communication in a session with the destination endpoint of the communication request; registering a callback resource to a signaling event of the session; monitoring signaling messages of the session; detecting the signaling event in the signaling messages of the session; and triggering the callback resource upon detecting the signaling event.

20 Claims, 25 Drawing Sheets

Related U.S. Application Data

(60) Provisional application No. 61/783,134, filed on Mar. 14, 2013.

(51) Int. Cl.
*H04L 29/12* (2006.01)
*H04M 7/00* (2006.01)
*H04L 29/08* (2006.01)
*H04M 1/247* (2006.01)

(52) U.S. Cl.
CPC ...... *H04L 65/1069* (2013.01); *H04L 65/1073* (2013.01); *H04L 29/06278* (2013.01); *H04L 65/1013* (2013.01); *H04L 67/14* (2013.01); *H04M 1/2473* (2013.01); *H04M 7/006* (2013.01)

(58) Field of Classification Search
CPC .............. H04L 65/1006; H04L 65/105; H04L 65/1073; H04M 7/006; H04M 1/2473
USPC .................................................. 709/219, 227
See application file for complete search history.

(56) References Cited

U.S. PATENT DOCUMENTS

| | | |
|---|---|---|
| 5,581,608 A | 12/1996 | Jreij et al. |
| 5,598,457 A | 1/1997 | Foladare et al. |
| 5,867,495 A | 2/1999 | Elliott et al. |
| 5,934,181 A | 8/1999 | Adamczewski |
| 5,978,465 A | 11/1999 | Corduroy et al. |
| 6,026,440 A | 2/2000 | Shrader et al. |
| 6,034,946 A | 3/2000 | Roginsky et al. |
| 6,094,681 A | 7/2000 | Shaffer et al. |
| 6,138,143 A | 10/2000 | Gigliotti et al. |
| 6,185,565 B1 | 2/2001 | Meubus et al. |
| 6,192,123 B1 | 2/2001 | Grunsted et al. |
| 6,206,564 B1 | 3/2001 | Adamczewski |
| 6,223,287 B1 | 4/2001 | Douglas et al. |
| 6,232,979 B1 | 5/2001 | Shochet |
| 6,269,336 B1 | 7/2001 | Ladd et al. |
| 6,317,137 B1 | 11/2001 | Rosasco |
| 6,363,065 B1 | 3/2002 | Thornton et al. |
| 6,373,836 B1 | 4/2002 | Deryugin et al. |
| 6,425,012 B1 | 7/2002 | Trovato et al. |
| 6,426,995 B1 | 7/2002 | Kim et al. |
| 6,430,175 B1 | 8/2002 | Echols et al. |
| 6,434,528 B1 | 8/2002 | Sanders |
| 6,445,694 B1 | 9/2002 | Swartz |
| 6,445,776 B1 | 9/2002 | Shank et al. |
| 6,459,913 B2 | 10/2002 | Cloutier |
| 6,463,414 B1 | 10/2002 | Su et al. |
| 6,493,558 B1 | 12/2002 | Bernhart et al. |
| 6,496,500 B2 | 12/2002 | Nance et al. |
| 6,501,739 B1 | 12/2002 | Cohen |
| 6,501,832 B1 | 12/2002 | Saylor et al. |
| 6,507,875 B1 | 1/2003 | Mellen-Garnett et al. |
| 6,571,245 B2 | 5/2003 | Huang et al. |
| 6,574,216 B1 | 6/2003 | Farris et al. |
| 6,577,721 B1 | 6/2003 | Vainio et al. |
| 6,600,736 B1 | 7/2003 | Ball et al. |
| 6,606,596 B1 | 8/2003 | Zirngibl et al. |
| 6,614,783 B1 | 9/2003 | Sonesh et al. |
| 6,625,258 B1 | 9/2003 | Ram et al. |
| 6,625,576 B2 | 9/2003 | Kochanski et al. |
| 6,636,504 B1 | 10/2003 | Albers et al. |
| 6,662,231 B1 | 12/2003 | Drosset et al. |
| 6,704,785 B1 | 3/2004 | Koo et al. |
| 6,707,889 B1 | 3/2004 | Saylor et al. |
| 6,711,129 B1 | 3/2004 | Bauer et al. |
| 6,711,249 B2 | 3/2004 | Weissman et al. |
| 6,738,738 B2 | 5/2004 | Henton |
| 6,757,365 B1 | 6/2004 | Bogard |
| 6,765,997 B1 | 7/2004 | Zirngibl et al. |
| 6,768,788 B1 | 7/2004 | Langseth et al. |
| 6,771,955 B2 | 8/2004 | Imura et al. |
| 6,778,653 B1 | 8/2004 | Kallas et al. |
| 6,785,266 B2 | 8/2004 | Swartz |
| 6,788,768 B1 | 9/2004 | Saylor et al. |
| 6,792,086 B1 | 9/2004 | Saylor et al. |
| 6,792,093 B2 | 9/2004 | Barak et al. |
| 6,798,867 B1 | 9/2004 | Zirngibl et al. |
| 6,807,529 B2 | 10/2004 | Johnson et al. |
| 6,807,574 B1 | 10/2004 | Partovi et al. |
| 6,819,667 B1 | 11/2004 | Brusilovsky et al. |
| 6,820,260 B1 | 11/2004 | Flockhart et al. |
| 6,829,334 B1 | 12/2004 | Zirngibl et al. |
| 6,831,966 B1 | 12/2004 | Tegan et al. |
| 6,834,265 B2 | 12/2004 | Balasuriya |
| 6,836,537 B1 | 12/2004 | Zirngibl et al. |
| 6,842,767 B1 | 1/2005 | Partovi et al. |
| 6,850,603 B1 | 2/2005 | Eberle et al. |
| 6,870,830 B1 | 3/2005 | Schuster et al. |
| 6,873,952 B1 | 3/2005 | Bailey et al. |
| 6,874,084 B1 | 3/2005 | Dobner et al. |
| 6,885,737 B1 | 4/2005 | Gao et al. |
| 6,888,929 B1 | 5/2005 | Saylor et al. |
| 6,895,084 B1 | 5/2005 | Saylor et al. |
| 6,898,567 B2 | 5/2005 | Balasuriya |
| 6,912,581 B2 | 6/2005 | Johnson et al. |
| 6,922,411 B1 | 7/2005 | Taylor |
| 6,928,469 B1 | 8/2005 | Duursma et al. |
| 6,931,405 B2 | 8/2005 | El-Shimi et al. |
| 6,937,699 B1 | 8/2005 | Schuster et al. |
| 6,940,953 B1 | 9/2005 | Eberle et al. |
| 6,941,268 B2 | 9/2005 | Porter et al. |
| 6,947,417 B2 | 9/2005 | Laursen et al. |
| 6,947,988 B1 | 9/2005 | Saleh |
| 6,961,330 B1 | 11/2005 | Cattan et al. |
| 6,964,012 B1 | 11/2005 | Zirngibl et al. |
| 6,970,915 B1 | 11/2005 | Partovi et al. |
| 6,977,992 B2 | 12/2005 | Zirngibl et al. |
| 6,981,041 B2 | 12/2005 | Araujo et al. |
| 6,985,862 B2 | 1/2006 | Stroem et al. |
| 6,999,576 B2 | 2/2006 | Sacra |
| 7,003,464 B2 | 2/2006 | Ferrans et al. |
| 7,006,606 B1 | 2/2006 | Cohen et al. |
| 7,010,586 B1 | 3/2006 | Allavarpu et al. |
| 7,020,685 B1 | 3/2006 | Chen et al. |
| 7,039,165 B1 | 5/2006 | Saylor et al. |
| 7,058,042 B2 | 6/2006 | Bontempi et al. |
| 7,058,181 B2 | 6/2006 | Wright et al. |
| 7,062,709 B2 | 6/2006 | Cheung |
| 7,065,637 B1 | 6/2006 | Nanja |
| 7,076,037 B1 | 7/2006 | Gonen et al. |
| 7,076,428 B2 | 7/2006 | Anastasakos et al. |
| 7,089,310 B1 | 8/2006 | Ellerman et al. |
| 7,099,442 B2 | 8/2006 | Da Palma et al. |
| 7,103,003 B2 | 9/2006 | Brueckheimer et al. |
| 7,103,171 B1 | 9/2006 | Annadata et al. |
| 7,106,844 B1 | 9/2006 | Holland |
| 7,111,163 B1 | 9/2006 | Haney |
| 7,136,932 B1 | 11/2006 | Schneider |
| 7,140,004 B1 | 11/2006 | Kunins et al. |
| 7,143,039 B1 | 11/2006 | Stifelman et al. |
| 7,197,331 B2 | 3/2007 | Anastasakos et al. |
| 7,197,461 B1 | 3/2007 | Eberle et al. |
| 7,197,462 B2 | 3/2007 | Takagi et al. |
| 7,197,544 B2 | 3/2007 | Wang et al. |
| 7,225,232 B2 | 5/2007 | Elberse |
| 7,227,849 B1 | 6/2007 | Rasanen |
| 7,245,611 B2 | 7/2007 | Narasimhan et al. |
| 7,260,208 B2 | 8/2007 | Cavalcanti |
| 7,266,181 B1 | 9/2007 | Zirngibl et al. |
| 7,269,557 B1 | 9/2007 | Bailey et al. |
| 7,272,212 B2 | 9/2007 | Eberle et al. |
| 7,272,564 B2 | 9/2007 | Phillips et al. |
| 7,277,851 B1 | 10/2007 | Henton |
| 7,283,515 B2 | 10/2007 | Fowler |
| 7,283,519 B2 | 10/2007 | Girard |
| 7,286,521 B1 | 10/2007 | Jackson et al. |
| 7,287,248 B1 | 10/2007 | Adeeb |
| 7,289,453 B2 | 10/2007 | Riedel et al. |
| 7,296,739 B1 | 11/2007 | Mo et al. |

(56) References Cited

U.S. PATENT DOCUMENTS

| | | |
|---|---|---|
| 7,298,732 B2 | 11/2007 | Cho |
| 7,298,834 B1 | 11/2007 | Homeier et al. |
| 7,308,085 B2 | 12/2007 | Weissman |
| 7,308,408 B1 | 12/2007 | Stifelman et al. |
| 7,324,633 B2 | 1/2008 | Gao et al. |
| 7,324,942 B1 | 1/2008 | Mahowald et al. |
| 7,328,263 B1 | 2/2008 | Sadjadi |
| 7,330,463 B1 | 2/2008 | Bradd et al. |
| 7,330,890 B1 | 2/2008 | Partovi et al. |
| 7,340,040 B1 | 3/2008 | Saylor et al. |
| 7,349,714 B2 | 3/2008 | Lee et al. |
| 7,369,865 B2 | 5/2008 | Gabriel et al. |
| 7,370,329 B2 | 5/2008 | Kumar et al. |
| 7,373,660 B1 | 5/2008 | Guichard et al. |
| 7,376,223 B2 | 5/2008 | Taylor et al. |
| 7,376,586 B1 | 5/2008 | Partovi et al. |
| 7,376,733 B2 | 5/2008 | Connelly et al. |
| 7,376,740 B1 | 5/2008 | Porter et al. |
| 7,412,525 B2 | 8/2008 | Cafarella et al. |
| 7,418,090 B2 | 8/2008 | Reding et al. |
| 7,428,302 B2 | 9/2008 | Zirngibl et al. |
| 7,440,898 B1 | 10/2008 | Eberle et al. |
| 7,447,299 B1 | 11/2008 | Partovi et al. |
| 7,454,459 B1 | 11/2008 | Kapoor et al. |
| 7,457,249 B2 | 11/2008 | Baldwin et al. |
| 7,457,397 B1 | 11/2008 | Saylor et al. |
| 7,473,872 B2 | 1/2009 | Takimoto |
| 7,486,780 B2 | 2/2009 | Zirngibl et al. |
| 7,496,054 B2 | 2/2009 | Taylor |
| 7,496,188 B2 | 2/2009 | Saha et al. |
| 7,496,651 B1 | 2/2009 | Joshi |
| 7,500,249 B2 | 3/2009 | Kampe et al. |
| 7,505,951 B2 | 3/2009 | Thompson et al. |
| 7,519,359 B2 | 4/2009 | Chiarulli et al. |
| 7,522,711 B1 | 4/2009 | Stein et al. |
| 7,536,454 B2 | 5/2009 | Balasuriya |
| 7,542,761 B2 | 6/2009 | Sarkar |
| 7,552,054 B1 | 6/2009 | Stifelman et al. |
| 7,571,226 B1 | 8/2009 | Partovi et al. |
| 7,606,868 B1 | 10/2009 | Le et al. |
| 7,613,287 B1 | 11/2009 | Stifelman et al. |
| 7,623,648 B1 | 11/2009 | Oppenheim et al. |
| 7,630,900 B1 | 12/2009 | Strom |
| 7,631,310 B1 | 12/2009 | Henzinger |
| 7,644,000 B1 | 1/2010 | Strom |
| 7,657,433 B1 | 2/2010 | Chang |
| 7,657,434 B2 | 2/2010 | Thompson et al. |
| 7,668,157 B2 | 2/2010 | Weintraub et al. |
| 7,672,275 B2 | 3/2010 | Yajnik et al. |
| 7,672,295 B1 | 3/2010 | Andhare et al. |
| 7,675,857 B1 | 3/2010 | Chesson |
| 7,676,221 B2 | 3/2010 | Roundtree et al. |
| 7,685,280 B2 | 3/2010 | Berry et al. |
| 7,685,298 B2 | 3/2010 | Day et al. |
| 7,715,547 B2 | 5/2010 | Ibbotson et al. |
| 7,716,293 B2 | 5/2010 | Kasuga et al. |
| 7,742,499 B1 | 6/2010 | Erskine et al. |
| 7,779,065 B2 | 8/2010 | Gupta et al. |
| 7,809,125 B2 | 10/2010 | Brunson et al. |
| 7,809,791 B2 | 10/2010 | Schwartz et al. |
| 7,875,836 B2 | 1/2011 | Imura et al. |
| 7,882,253 B2 | 2/2011 | Pardo-Castellote et al. |
| 7,920,866 B2 | 4/2011 | Bosch et al. |
| 7,926,099 B1 | 4/2011 | Chakravarty et al. |
| 7,929,562 B2 | 4/2011 | Petrovykh |
| 7,936,867 B1 | 5/2011 | Hill et al. |
| 7,949,111 B2 | 5/2011 | Harlow et al. |
| 7,962,644 B1 | 6/2011 | Ezerzer et al. |
| 7,979,555 B2 | 7/2011 | Rothstein et al. |
| 7,992,120 B1 | 8/2011 | Wang et al. |
| 8,023,425 B2 | 9/2011 | Raleigh |
| 8,024,785 B2 | 9/2011 | Andress et al. |
| 8,045,689 B2 | 10/2011 | Provenzale et al. |
| 8,046,378 B1 | 10/2011 | Zhuge et al. |
| 8,046,823 B1 | 10/2011 | Begen et al. |
| 8,069,096 B1 | 11/2011 | Ballaro et al. |
| 8,078,483 B1 | 12/2011 | Hirose et al. |
| 8,081,744 B2 | 12/2011 | Sylvain |
| 8,081,958 B2 | 12/2011 | Soederstroem et al. |
| 8,103,725 B2 | 1/2012 | Gupta et al. |
| 8,126,128 B1 | 2/2012 | Hicks, III et al. |
| 8,126,129 B1 | 2/2012 | McGuire |
| 8,130,750 B2 | 3/2012 | Hester |
| 8,130,917 B2 | 3/2012 | Helbling et al. |
| 8,139,730 B2 | 3/2012 | Palma et al. |
| 8,145,212 B2 | 3/2012 | Lopresti et al. |
| 8,149,716 B2 | 4/2012 | Ramanathan et al. |
| 8,150,918 B1 | 4/2012 | Edelman et al. |
| 8,156,213 B1 | 4/2012 | Deng et al. |
| 8,165,116 B2 | 4/2012 | Ku et al. |
| 8,166,185 B2 | 4/2012 | Samuel et al. |
| 8,169,936 B2 | 5/2012 | Koren et al. |
| 8,175,007 B2 | 5/2012 | Jain et al. |
| 8,185,619 B1 | 5/2012 | Maiocco et al. |
| 8,196,133 B2 | 6/2012 | Kakumani et al. |
| 8,204,479 B2 | 6/2012 | Vendrow et al. |
| 8,214,868 B2 | 7/2012 | Hamilton et al. |
| 8,218,457 B2 | 7/2012 | Malhotra et al. |
| 8,233,611 B1 | 7/2012 | Zettner |
| 8,238,533 B2 | 8/2012 | Blackwell et al. |
| 8,243,889 B2 | 8/2012 | Taylor et al. |
| 8,249,552 B1 | 8/2012 | Gailloux et al. |
| 8,266,327 B2 | 9/2012 | Kumar et al. |
| 8,295,272 B2 | 10/2012 | Boni et al. |
| 8,301,117 B2 | 10/2012 | Keast et al. |
| 8,306,021 B2 | 11/2012 | Lawson et al. |
| 8,315,198 B2 | 11/2012 | Corneille et al. |
| 8,315,369 B2 | 11/2012 | Lawson et al. |
| 8,315,620 B1 | 11/2012 | Williamson et al. |
| 8,319,816 B1 | 11/2012 | Swanson et al. |
| 8,326,805 B1 | 12/2012 | Arous et al. |
| 8,335,852 B2 | 12/2012 | Hokimoto |
| 8,346,630 B1 | 1/2013 | McKeown |
| 8,355,394 B2 | 1/2013 | Taylor et al. |
| 8,411,669 B2 | 4/2013 | Chen et al. |
| 8,413,247 B2 | 4/2013 | Hudis et al. |
| 8,417,817 B1 | 4/2013 | Jacobs |
| 8,429,827 B1 | 4/2013 | Wetzel |
| 8,438,315 B1 | 5/2013 | Tao et al. |
| 8,462,670 B2 | 6/2013 | Chien et al. |
| 8,467,502 B2 | 6/2013 | Sureka et al. |
| 8,477,926 B2 | 7/2013 | Jasper et al. |
| 8,503,639 B2 | 8/2013 | Reding et al. |
| 8,503,650 B2 | 8/2013 | Reding et al. |
| 8,504,818 B2 | 8/2013 | Rao et al. |
| 8,509,068 B2 | 8/2013 | Begall et al. |
| 8,532,686 B2 | 9/2013 | Schmidt et al. |
| 8,533,857 B2 | 9/2013 | Tuchman et al. |
| 8,542,805 B2 | 9/2013 | Agranovsky et al. |
| 8,543,665 B2 | 9/2013 | Ansari et al. |
| 8,547,962 B2 | 10/2013 | Ramachandran et al. |
| 8,549,047 B2 | 10/2013 | Beechuk et al. |
| 8,565,117 B2 | 10/2013 | Hilt et al. |
| 8,572,391 B2 | 10/2013 | Golan et al. |
| 8,576,712 B2 | 11/2013 | Sabat et al. |
| 8,577,803 B2 | 11/2013 | Chatterjee et al. |
| 8,582,450 B1 | 11/2013 | Robesky |
| 8,582,737 B2 | 11/2013 | Lawson et al. |
| 8,594,626 B1 | 11/2013 | Woodson et al. |
| 8,601,136 B1 | 12/2013 | Fahlgren et al. |
| 8,611,338 B2 | 12/2013 | Lawson et al. |
| 8,613,102 B2 | 12/2013 | Nath |
| 8,621,598 B2 | 12/2013 | Lai et al. |
| 8,649,268 B2 | 2/2014 | Lawson et al. |
| 8,656,452 B2 | 2/2014 | Li et al. |
| 8,667,056 B1 | 3/2014 | Proulx et al. |
| 8,675,493 B2 | 3/2014 | Buddhikot et al. |
| 8,688,147 B2 | 4/2014 | Nguyen et al. |
| 8,695,077 B1 | 4/2014 | Gerhard et al. |
| 8,713,693 B2 | 4/2014 | Shanabrook et al. |
| 8,728,656 B2 | 5/2014 | Takahashi et al. |
| 8,751,801 B2 | 6/2014 | Harris et al. |
| 8,755,376 B2 | 6/2014 | Lawson et al. |
| 8,767,925 B2 | 7/2014 | Sureka et al. |

(56) References Cited

U.S. PATENT DOCUMENTS

| | | |
|---|---|---|
| 8,781,975 B2 | 7/2014 | Bennett et al. |
| 8,797,920 B2 | 8/2014 | Parreira |
| 8,806,024 B1 | 8/2014 | Francis et al. |
| 8,819,133 B2 | 8/2014 | Wang |
| 8,825,746 B2 | 9/2014 | Ravichandran et al. |
| 8,837,465 B2 | 9/2014 | Lawson et al. |
| 8,838,707 B2 | 9/2014 | Lawson et al. |
| 8,843,596 B2 | 9/2014 | Goel et al. |
| 8,855,271 B2 | 10/2014 | Brock et al. |
| 8,861,510 B1 | 10/2014 | Fritz |
| 8,879,547 B2 | 11/2014 | Maes |
| 8,903,938 B2 | 12/2014 | Vermeulen et al. |
| 8,918,848 B2 | 12/2014 | Sharma et al. |
| 8,924,489 B2 | 12/2014 | Bleau et al. |
| 8,938,053 B2 | 1/2015 | Cooke et al. |
| 8,948,356 B2 | 2/2015 | Nowack et al. |
| 8,954,591 B2 | 2/2015 | Ganesan et al. |
| 8,964,726 B2 | 2/2015 | Lawson et al. |
| 8,990,610 B2 | 3/2015 | Bostick et al. |
| 9,014,664 B2 | 4/2015 | Kim et al. |
| 9,015,702 B2 | 4/2015 | Bhat |
| 9,031,223 B2 | 5/2015 | Smith et al. |
| 9,071,677 B2 | 6/2015 | Aggarwal et al. |
| 9,137,127 B2 | 9/2015 | Nowack et al. |
| 9,141,682 B1 | 9/2015 | Adoc, Jr. et al. |
| 9,161,296 B2 | 10/2015 | Parsons et al. |
| 9,177,007 B2 | 11/2015 | Winters et al. |
| 9,204,281 B2 | 12/2015 | Ramprasad et al. |
| 9,210,275 B2 | 12/2015 | Lawson et al. |
| 9,306,982 B2 | 4/2016 | Lawson et al. |
| 9,307,094 B2 | 4/2016 | Nowack et al. |
| 9,325,624 B2 | 4/2016 | Malatack et al. |
| 9,338,190 B2 | 5/2016 | Eng et al. |
| 9,344,573 B2 | 5/2016 | Wolthuis et al. |
| 9,356,916 B2 | 5/2016 | Kravitz et al. |
| 9,378,337 B2 | 6/2016 | Kuhr |
| 9,398,622 B2 | 7/2016 | Lawson et al. |
| 9,456,008 B2 | 9/2016 | Lawson et al. |
| 9,456,339 B1 | 9/2016 | Hildner et al. |
| 9,460,169 B2 | 10/2016 | Hinton et al. |
| 9,596,274 B2 | 3/2017 | Lawson et al. |
| 9,628,624 B2 | 4/2017 | Wolthuis et al. |
| 9,632,875 B2 | 4/2017 | Raichstein et al. |
| 9,634,995 B2 | 4/2017 | Binder |
| 2001/0038624 A1 | 11/2001 | Greenberg et al. |
| 2001/0043684 A1 | 11/2001 | Guedalia et al. |
| 2001/0051996 A1 | 12/2001 | Cooper et al. |
| 2002/0006124 A1 | 1/2002 | Jimenez et al. |
| 2002/0006125 A1 | 1/2002 | Josse et al. |
| 2002/0006193 A1 | 1/2002 | Rodenbusch et al. |
| 2002/0025819 A1 | 2/2002 | Cetusic et al. |
| 2002/0057777 A1 | 5/2002 | Saito et al. |
| 2002/0064267 A1 | 5/2002 | Martin et al. |
| 2002/0067823 A1 | 6/2002 | Walker et al. |
| 2002/0077833 A1 | 6/2002 | Arons et al. |
| 2002/0126813 A1 | 9/2002 | Partovi et al. |
| 2002/0133587 A1 | 9/2002 | Ensel et al. |
| 2002/0136391 A1 | 9/2002 | Armstrong |
| 2002/0165957 A1 | 11/2002 | Devoe et al. |
| 2002/0176378 A1 | 11/2002 | Hamilton et al. |
| 2002/0184361 A1 | 12/2002 | Eden |
| 2002/0198941 A1 | 12/2002 | Gavrilescu et al. |
| 2003/0006137 A1 | 1/2003 | Wei et al. |
| 2003/0012356 A1 | 1/2003 | Zino et al. |
| 2003/0014665 A1 | 1/2003 | Anderson et al. |
| 2003/0018830 A1 | 1/2003 | Chen et al. |
| 2003/0023672 A1 | 1/2003 | Vaysman |
| 2003/0026426 A1 | 2/2003 | Wright et al. |
| 2003/0046366 A1 | 3/2003 | Pardikar et al. |
| 2003/0051037 A1 | 3/2003 | Sundaram et al. |
| 2003/0058884 A1 | 3/2003 | Kallner et al. |
| 2003/0059020 A1 | 3/2003 | Meyerson et al. |
| 2003/0060188 A1 | 3/2003 | Gidron et al. |
| 2003/0061317 A1 | 3/2003 | Brown et al. |
| 2003/0061404 A1 | 3/2003 | Atwal et al. |
| 2003/0088421 A1 | 5/2003 | Maes et al. |
| 2003/0097330 A1 | 5/2003 | Hillmer et al. |
| 2003/0097447 A1 | 5/2003 | Johnston |
| 2003/0097639 A1 | 5/2003 | Niyogi et al. |
| 2003/0103620 A1 | 6/2003 | Brown et al. |
| 2003/0123640 A1 | 7/2003 | Roelle et al. |
| 2003/0149721 A1 | 8/2003 | Alfonso-Nogueiro et al. |
| 2003/0162506 A1 | 8/2003 | Toshimitsu et al. |
| 2003/0195950 A1 | 10/2003 | Huang et al. |
| 2003/0195990 A1 | 10/2003 | Greenblat |
| 2003/0196076 A1 | 10/2003 | Zabarski et al. |
| 2003/0204616 A1 | 10/2003 | Billhartz et al. |
| 2003/0211842 A1 | 11/2003 | Kempf et al. |
| 2003/0231647 A1 | 12/2003 | Petrovykh |
| 2003/0233276 A1 | 12/2003 | Pearlman et al. |
| 2004/0008635 A1 | 1/2004 | Nelson et al. |
| 2004/0011690 A1 | 1/2004 | Marfino et al. |
| 2004/0044953 A1 | 3/2004 | Watkins et al. |
| 2004/0052349 A1 | 3/2004 | Creamer et al. |
| 2004/0071275 A1 | 4/2004 | Bowater et al. |
| 2004/0101122 A1 | 5/2004 | Palma et al. |
| 2004/0102182 A1 | 5/2004 | Reith et al. |
| 2004/0117788 A1 | 6/2004 | Karaoguz et al. |
| 2004/0136324 A1 | 7/2004 | Steinberg et al. |
| 2004/0165569 A1 | 8/2004 | Sweatman et al. |
| 2004/0172482 A1 | 9/2004 | Weissman et al. |
| 2004/0199572 A1 | 10/2004 | Hunt et al. |
| 2004/0205101 A1 | 10/2004 | Radhakrishnan |
| 2004/0205689 A1 | 10/2004 | Ellens et al. |
| 2004/0213400 A1 | 10/2004 | Golitsin et al. |
| 2004/0216058 A1 | 10/2004 | Chavers et al. |
| 2004/0218748 A1 | 11/2004 | Fisher |
| 2004/0228469 A1 | 11/2004 | Andrews et al. |
| 2004/0236696 A1 | 11/2004 | Aoki et al. |
| 2004/0240649 A1 | 12/2004 | Goel |
| 2005/0005109 A1 | 1/2005 | Castaldi et al. |
| 2005/0005200 A1 | 1/2005 | Matena et al. |
| 2005/0010483 A1 | 1/2005 | Ling |
| 2005/0015505 A1 | 1/2005 | Kruis et al. |
| 2005/0021626 A1 | 1/2005 | Prajapat et al. |
| 2005/0025303 A1 | 2/2005 | Hostetler |
| 2005/0038772 A1 | 2/2005 | Colrain |
| 2005/0043952 A1 | 2/2005 | Sharma et al. |
| 2005/0047579 A1 | 3/2005 | Salame |
| 2005/0060411 A1 | 3/2005 | Coulombe et al. |
| 2005/0083907 A1 | 4/2005 | Fishier |
| 2005/0091336 A1 | 4/2005 | DeHamer et al. |
| 2005/0091572 A1 | 4/2005 | Gavrilescu et al. |
| 2005/0108770 A1 | 5/2005 | Karaoguz et al. |
| 2005/0125251 A1 | 6/2005 | Berger et al. |
| 2005/0125739 A1 | 6/2005 | Thompson et al. |
| 2005/0128961 A1 | 6/2005 | Miloslaysky et al. |
| 2005/0135578 A1 | 6/2005 | Ress et al. |
| 2005/0141500 A1 | 6/2005 | Bhandari et al. |
| 2005/0147088 A1 | 7/2005 | Bao et al. |
| 2005/0177635 A1 | 8/2005 | Schmidt et al. |
| 2005/0181835 A1 | 8/2005 | Lau et al. |
| 2005/0198292 A1 | 9/2005 | Duursma et al. |
| 2005/0228680 A1 | 10/2005 | Malik |
| 2005/0238153 A1 | 10/2005 | Chevalier |
| 2005/0240659 A1 | 10/2005 | Taylor |
| 2005/0243977 A1 | 11/2005 | Creamer et al. |
| 2005/0246176 A1 | 11/2005 | Creamer et al. |
| 2005/0289222 A1 | 12/2005 | Sahim |
| 2006/0008065 A1 | 1/2006 | Longman et al. |
| 2006/0008073 A1 | 1/2006 | Yoshizawa et al. |
| 2006/0008256 A1 | 1/2006 | Khedouri et al. |
| 2006/0015467 A1 | 1/2006 | Morken et al. |
| 2006/0021004 A1 | 1/2006 | Moran et al. |
| 2006/0023676 A1 | 2/2006 | Whitmore et al. |
| 2006/0047666 A1 | 3/2006 | Bedi et al. |
| 2006/0067506 A1 | 3/2006 | Flockhart et al. |
| 2006/0080415 A1 | 4/2006 | Tu |
| 2006/0098624 A1 | 5/2006 | Morgan et al. |
| 2006/0129638 A1 | 6/2006 | Deakin |
| 2006/0143007 A1 | 6/2006 | Koh et al. |
| 2006/0146792 A1 | 7/2006 | Ramachandran et al. |
| 2006/0146802 A1 | 7/2006 | Baldwin et al. |
| 2006/0168334 A1 | 7/2006 | Potti et al. |

(56) References Cited

U.S. PATENT DOCUMENTS

| | | |
|---|---|---|
| 2006/0203979 A1 | 9/2006 | Jennings |
| 2006/0209695 A1 | 9/2006 | Archer et al. |
| 2006/0212865 A1 | 9/2006 | Vincent et al. |
| 2006/0215824 A1 | 9/2006 | Mitby et al. |
| 2006/0217823 A1 | 9/2006 | Hussey |
| 2006/0217978 A1 | 9/2006 | Mitby et al. |
| 2006/0222166 A1 | 10/2006 | Ramakrishna et al. |
| 2006/0235715 A1 | 10/2006 | Abrams et al. |
| 2006/0256816 A1 | 11/2006 | Yarlagadda et al. |
| 2006/0262915 A1 | 11/2006 | Marascio et al. |
| 2006/0270386 A1 | 11/2006 | Yu et al. |
| 2006/0285489 A1 | 12/2006 | Francisco et al. |
| 2007/0002744 A1 | 1/2007 | Mewhinney et al. |
| 2007/0036143 A1 | 2/2007 | Alt et al. |
| 2007/0038499 A1 | 2/2007 | Margulies et al. |
| 2007/0043681 A1 | 2/2007 | Morgan et al. |
| 2007/0050306 A1 | 3/2007 | McQueen |
| 2007/0064672 A1 | 3/2007 | Raghav et al. |
| 2007/0070906 A1 | 3/2007 | Thakur |
| 2007/0070980 A1 | 3/2007 | Phelps et al. |
| 2007/0071223 A1 | 3/2007 | Lee et al. |
| 2007/0074174 A1 | 3/2007 | Thornton |
| 2007/0088836 A1 | 4/2007 | Tai et al. |
| 2007/0091907 A1 | 4/2007 | Seshadri et al. |
| 2007/0107048 A1 | 5/2007 | Halls et al. |
| 2007/0112574 A1 | 5/2007 | Greene |
| 2007/0116191 A1 | 5/2007 | Bermudez et al. |
| 2007/0121651 A1 | 5/2007 | Casey et al. |
| 2007/0127691 A1 | 6/2007 | Lert |
| 2007/0127703 A1 | 6/2007 | Siminoff |
| 2007/0130260 A1 | 6/2007 | Weintraub et al. |
| 2007/0133771 A1 | 6/2007 | Stifelman et al. |
| 2007/0147351 A1 | 6/2007 | Dietrich et al. |
| 2007/0149166 A1 | 6/2007 | Turcotte et al. |
| 2007/0153711 A1 | 7/2007 | Dykas et al. |
| 2007/0167170 A1 | 7/2007 | Fitchett et al. |
| 2007/0192629 A1 | 8/2007 | Saito |
| 2007/0201448 A1 | 8/2007 | Baird et al. |
| 2007/0208862 A1 | 9/2007 | Fox et al. |
| 2007/0232284 A1 | 10/2007 | Mason et al. |
| 2007/0239761 A1 | 10/2007 | Baio et al. |
| 2007/0242626 A1 | 10/2007 | Altberg et al. |
| 2007/0255828 A1 | 11/2007 | Paradise |
| 2007/0265073 A1 | 11/2007 | Novi et al. |
| 2007/0286180 A1 | 12/2007 | Marquette et al. |
| 2007/0291734 A1 | 12/2007 | Bhatia et al. |
| 2007/0291905 A1 | 12/2007 | Halliday et al. |
| 2007/0293200 A1 | 12/2007 | Roundtree et al. |
| 2007/0295803 A1 | 12/2007 | Levine et al. |
| 2008/0005275 A1 | 1/2008 | Overton et al. |
| 2008/0008157 A1* | 1/2008 | Edge ............... H04W 4/90 370/351 |
| 2008/0025320 A1 | 1/2008 | Bangalore et al. |
| 2008/0037715 A1 | 2/2008 | Prozeniuk et al. |
| 2008/0037746 A1 | 2/2008 | Dufrene et al. |
| 2008/0040484 A1 | 2/2008 | Yardley |
| 2008/0049617 A1 | 2/2008 | Grice et al. |
| 2008/0052395 A1 | 2/2008 | Wright et al. |
| 2008/0091843 A1 | 4/2008 | Kulkarni |
| 2008/0101571 A1 | 5/2008 | Harlow et al. |
| 2008/0104348 A1 | 5/2008 | Kabzinski et al. |
| 2008/0120702 A1 | 5/2008 | Hokimoto |
| 2008/0123559 A1 | 5/2008 | Haviv et al. |
| 2008/0134049 A1 | 6/2008 | Gupta et al. |
| 2008/0139166 A1 | 6/2008 | Agarwal et al. |
| 2008/0146268 A1 | 6/2008 | Gandhi et al. |
| 2008/0152101 A1 | 6/2008 | Griggs |
| 2008/0154601 A1 | 6/2008 | Stifelman et al. |
| 2008/0155029 A1 | 6/2008 | Helbling et al. |
| 2008/0162482 A1 | 7/2008 | Ahern et al. |
| 2008/0165708 A1 | 7/2008 | Moore et al. |
| 2008/0172404 A1 | 7/2008 | Cohen |
| 2008/0177883 A1 | 7/2008 | Hanai et al. |
| 2008/0192736 A1 | 8/2008 | Jabri et al. |
| 2008/0201426 A1 | 8/2008 | Darcie |
| 2008/0209050 A1 | 8/2008 | Li |
| 2008/0212945 A1 | 9/2008 | Khedouri et al. |
| 2008/0222656 A1 | 9/2008 | Lyman |
| 2008/0229421 A1 | 9/2008 | Hudis et al. |
| 2008/0232574 A1 | 9/2008 | Baluja et al. |
| 2008/0235230 A1 | 9/2008 | Maes |
| 2008/0256224 A1 | 10/2008 | Kaji et al. |
| 2008/0275741 A1 | 11/2008 | Loeffen |
| 2008/0307436 A1 | 12/2008 | Hamilton |
| 2008/0310599 A1 | 12/2008 | Purnadi et al. |
| 2008/0313318 A1 | 12/2008 | Vermeulen et al. |
| 2008/0316931 A1 | 12/2008 | Qiu et al. |
| 2008/0317222 A1 | 12/2008 | Griggs et al. |
| 2008/0317232 A1 | 12/2008 | Couse et al. |
| 2008/0317233 A1 | 12/2008 | Rey et al. |
| 2009/0046838 A1 | 2/2009 | Andreasson |
| 2009/0052437 A1 | 2/2009 | Taylor et al. |
| 2009/0052641 A1 | 2/2009 | Taylor et al. |
| 2009/0059894 A1 | 3/2009 | Jackson et al. |
| 2009/0063502 A1 | 3/2009 | Coimbatore et al. |
| 2009/0074159 A1 | 3/2009 | Goldfarb et al. |
| 2009/0075684 A1 | 3/2009 | Cheng et al. |
| 2009/0083155 A1 | 3/2009 | Tudor et al. |
| 2009/0089165 A1 | 4/2009 | Sweeney |
| 2009/0089352 A1 | 4/2009 | Davis et al. |
| 2009/0089699 A1 | 4/2009 | Saha et al. |
| 2009/0093250 A1 | 4/2009 | Jackson et al. |
| 2009/0094674 A1 | 4/2009 | Swartz |
| 2009/0122793 A1* | 5/2009 | Yang ............... H04L 65/40 370/352 |
| 2009/0125608 A1 | 5/2009 | Werth et al. |
| 2009/0129573 A1 | 5/2009 | Gavan et al. |
| 2009/0136011 A1 | 5/2009 | Goel |
| 2009/0170496 A1 | 7/2009 | Bourque |
| 2009/0171659 A1 | 7/2009 | Pearce et al. |
| 2009/0171669 A1 | 7/2009 | Engelsma et al. |
| 2009/0171752 A1 | 7/2009 | Galvin et al. |
| 2009/0182896 A1 | 7/2009 | Patterson et al. |
| 2009/0193433 A1 | 7/2009 | Maes |
| 2009/0216835 A1 | 8/2009 | Jain et al. |
| 2009/0217293 A1 | 8/2009 | Wolber et al. |
| 2009/0220057 A1 | 9/2009 | Waters |
| 2009/0221310 A1 | 9/2009 | Chen et al. |
| 2009/0222341 A1 | 9/2009 | Belwadi et al. |
| 2009/0225748 A1 | 9/2009 | Taylor |
| 2009/0225763 A1 | 9/2009 | Forsberg et al. |
| 2009/0228868 A1 | 9/2009 | Drukman et al. |
| 2009/0232289 A1 | 9/2009 | Drucker et al. |
| 2009/0234965 A1 | 9/2009 | Viveganandhan et al. |
| 2009/0235349 A1 | 9/2009 | Lai et al. |
| 2009/0241135 A1 | 9/2009 | Wong et al. |
| 2009/0252159 A1 | 10/2009 | Lawson et al. |
| 2009/0276771 A1 | 11/2009 | Nickolov et al. |
| 2009/0288012 A1 | 11/2009 | Udo et al. |
| 2009/0288165 A1 | 11/2009 | Qiu et al. |
| 2009/0300194 A1 | 12/2009 | Ogasawara |
| 2009/0316687 A1 | 12/2009 | Kruppa |
| 2009/0318112 A1 | 12/2009 | Vasten |
| 2010/0027531 A1 | 2/2010 | Kurashima |
| 2010/0037204 A1 | 2/2010 | Lin et al. |
| 2010/0054142 A1 | 3/2010 | Moiso et al. |
| 2010/0070424 A1 | 3/2010 | Monk |
| 2010/0071053 A1 | 3/2010 | Ansari et al. |
| 2010/0082513 A1 | 4/2010 | Liu |
| 2010/0087215 A1 | 4/2010 | Gu et al. |
| 2010/0088187 A1 | 4/2010 | Courtney et al. |
| 2010/0088698 A1 | 4/2010 | Krishnamurthy |
| 2010/0094758 A1 | 4/2010 | Chamberlain et al. |
| 2010/0103845 A1 | 4/2010 | Ulupinar et al. |
| 2010/0107222 A1 | 4/2010 | Glasser |
| 2010/0115041 A1 | 5/2010 | Hawkins et al. |
| 2010/0138501 A1 | 6/2010 | Clinton et al. |
| 2010/0142516 A1 | 6/2010 | Lawson et al. |
| 2010/0150139 A1 | 6/2010 | Lawson et al. |
| 2010/0167689 A1 | 7/2010 | Sepehri-Nik et al. |
| 2010/0188979 A1 | 7/2010 | Thubert et al. |
| 2010/0191915 A1 | 7/2010 | Spencer |
| 2010/0208881 A1 | 8/2010 | Kawamura |
| 2010/0217837 A1 | 8/2010 | Ansari et al. |

(56) References Cited

U.S. PATENT DOCUMENTS

| | | |
|---|---|---|
| 2010/0217982 A1 | 8/2010 | Brown et al. |
| 2010/0232594 A1 | 9/2010 | Lawson et al. |
| 2010/0235539 A1 | 9/2010 | Carter et al. |
| 2010/0250946 A1 | 9/2010 | Korte et al. |
| 2010/0251329 A1 | 9/2010 | Wei |
| 2010/0251340 A1 | 9/2010 | Martin et al. |
| 2010/0265825 A1 | 10/2010 | Blair et al. |
| 2010/0281108 A1 | 11/2010 | Cohen |
| 2010/0291910 A1 | 11/2010 | Sanding et al. |
| 2010/0299437 A1 | 11/2010 | Moore |
| 2010/0312919 A1 | 12/2010 | Lee et al. |
| 2010/0332852 A1 | 12/2010 | Vembu et al. |
| 2011/0026516 A1 | 2/2011 | Roberts et al. |
| 2011/0029882 A1 | 2/2011 | Jaisinghani |
| 2011/0029981 A1 | 2/2011 | Jaisinghani |
| 2011/0053555 A1 | 3/2011 | Cai et al. |
| 2011/0078278 A1 | 3/2011 | Cui et al. |
| 2011/0081008 A1 | 4/2011 | Lawson et al. |
| 2011/0083069 A1 | 4/2011 | Paul et al. |
| 2011/0083179 A1 | 4/2011 | Lawson et al. |
| 2011/0093516 A1 | 4/2011 | Geng et al. |
| 2011/0096673 A1 | 4/2011 | Stevenson et al. |
| 2011/0110366 A1 | 5/2011 | Moore et al. |
| 2011/0131293 A1 | 6/2011 | Mori |
| 2011/0138453 A1 | 6/2011 | Verma et al. |
| 2011/0143714 A1 | 6/2011 | Keast et al. |
| 2011/0145049 A1 | 6/2011 | Lido et al. |
| 2011/0149810 A1 | 6/2011 | Koren et al. |
| 2011/0149950 A1 | 6/2011 | Petit-Huguenin et al. |
| 2011/0151884 A1 | 6/2011 | Zhao |
| 2011/0158235 A1 | 6/2011 | Senga |
| 2011/0167172 A1 | 7/2011 | Roach et al. |
| 2011/0170505 A1 | 7/2011 | Rajasekar et al. |
| 2011/0176537 A1 | 7/2011 | Lawson et al. |
| 2011/0179126 A1 | 7/2011 | Wetherell et al. |
| 2011/0211679 A1 | 9/2011 | Mezhibovsky et al. |
| 2011/0251921 A1 | 10/2011 | Kassaei et al. |
| 2011/0253693 A1 | 10/2011 | Lyons et al. |
| 2011/0255675 A1 | 10/2011 | Jasper et al. |
| 2011/0258432 A1 | 10/2011 | Rao et al. |
| 2011/0265168 A1 | 10/2011 | Lucovsky et al. |
| 2011/0265172 A1 | 10/2011 | Sharma et al. |
| 2011/0267985 A1 | 11/2011 | Wilkinson et al. |
| 2011/0274111 A1 | 11/2011 | Narasappa et al. |
| 2011/0276892 A1 | 11/2011 | Jensen-Horne et al. |
| 2011/0276951 A1 | 11/2011 | Jain |
| 2011/0280390 A1 | 11/2011 | Lawson et al. |
| 2011/0283259 A1 | 11/2011 | Lawson et al. |
| 2011/0289126 A1 | 11/2011 | Aikas et al. |
| 2011/0289162 A1 | 11/2011 | Furlong et al. |
| 2011/0299672 A1 | 12/2011 | Chiu et al. |
| 2011/0310902 A1 | 12/2011 | Xu |
| 2011/0313950 A1 | 12/2011 | Nuggehalli et al. |
| 2011/0320449 A1 | 12/2011 | Gudlavenkatasiva |
| 2011/0320550 A1 | 12/2011 | Lawson et al. |
| 2012/0000903 A1 | 1/2012 | Baarman et al. |
| 2012/0011274 A1 | 1/2012 | Moreman |
| 2012/0017222 A1 | 1/2012 | May |
| 2012/0023531 A1 | 1/2012 | Meuninck et al. |
| 2012/0023544 A1 | 1/2012 | Li et al. |
| 2012/0027228 A1 | 2/2012 | Rijken et al. |
| 2012/0028602 A1 | 2/2012 | Lisi et al. |
| 2012/0036574 A1 | 2/2012 | Heithcock et al. |
| 2012/0039202 A1 | 2/2012 | Song |
| 2012/0059709 A1 | 3/2012 | Lieberman et al. |
| 2012/0079066 A1 | 3/2012 | Li et al. |
| 2012/0083266 A1 | 4/2012 | VanSwol et al. |
| 2012/0089572 A1 | 4/2012 | Raichstein et al. |
| 2012/0094637 A1 | 4/2012 | Jeyaseelan et al. |
| 2012/0101952 A1 | 4/2012 | Raleigh et al. |
| 2012/0110564 A1 | 5/2012 | Ran et al. |
| 2012/0114112 A1 | 5/2012 | Rauschenberger et al. |
| 2012/0149404 A1 | 6/2012 | Beattie et al. |
| 2012/0166488 A1 | 6/2012 | Kaushik et al. |
| 2012/0170726 A1 | 7/2012 | Schwartz |
| 2012/0173610 A1 | 7/2012 | Bleau et al. |
| 2012/0174095 A1 | 7/2012 | Natchadalingam et al. |
| 2012/0179646 A1 | 7/2012 | Hinton |
| 2012/0179907 A1 | 7/2012 | Byrd et al. |
| 2012/0180021 A1 | 7/2012 | Byrd et al. |
| 2012/0180029 A1 | 7/2012 | Hill et al. |
| 2012/0185561 A1 | 7/2012 | Klein et al. |
| 2012/0198004 A1 | 8/2012 | Watte |
| 2012/0201238 A1 | 8/2012 | Lawson et al. |
| 2012/0208495 A1 | 8/2012 | Lawson et al. |
| 2012/0221603 A1 | 8/2012 | Kothule et al. |
| 2012/0226579 A1 | 9/2012 | Ha et al. |
| 2012/0239757 A1 | 9/2012 | Firstenberg et al. |
| 2012/0240226 A1 | 9/2012 | Li |
| 2012/0246273 A1 | 9/2012 | Bornstein et al. |
| 2012/0254828 A1 | 10/2012 | Aiylam et al. |
| 2012/0281536 A1 | 11/2012 | Gell et al. |
| 2012/0288082 A1 | 11/2012 | Segall |
| 2012/0290706 A1 | 11/2012 | Lin et al. |
| 2012/0304245 A1 | 11/2012 | Lawson et al. |
| 2012/0304275 A1 | 11/2012 | Ji et al. |
| 2012/0316809 A1 | 12/2012 | Egolf et al. |
| 2012/0321058 A1 | 12/2012 | Eng et al. |
| 2012/0321070 A1 | 12/2012 | Smith et al. |
| 2013/0029629 A1 | 1/2013 | Lindholm et al. |
| 2013/0031158 A1 | 1/2013 | Salsburg |
| 2013/0031613 A1 | 1/2013 | Shanabrook |
| 2013/0036476 A1 | 2/2013 | Roever et al. |
| 2013/0047232 A1 | 2/2013 | Tuchman et al. |
| 2013/0054517 A1 | 2/2013 | Beechuk |
| 2013/0054684 A1 | 2/2013 | Brazier et al. |
| 2013/0058262 A1 | 3/2013 | Parreira |
| 2013/0067232 A1 | 3/2013 | Cheung et al. |
| 2013/0067448 A1 | 3/2013 | Sannidhanam et al. |
| 2013/0097298 A1 | 4/2013 | Ting et al. |
| 2013/0110658 A1 | 5/2013 | Lyman et al. |
| 2013/0132573 A1 | 5/2013 | Lindblom |
| 2013/0139148 A1 | 5/2013 | Berg et al. |
| 2013/0156024 A1 | 6/2013 | Burg |
| 2013/0166580 A1 | 6/2013 | Maharajh et al. |
| 2013/0179942 A1 | 7/2013 | Caplis et al. |
| 2013/0201909 A1 | 8/2013 | Bosch et al. |
| 2013/0204786 A1 | 8/2013 | Mattes et al. |
| 2013/0212603 A1 | 8/2013 | Cooke et al. |
| 2013/0244632 A1 | 9/2013 | Spence et al. |
| 2013/0268676 A1 | 10/2013 | Martins et al. |
| 2013/0325934 A1 | 12/2013 | Fausak et al. |
| 2013/0328997 A1 | 12/2013 | Desai |
| 2013/0336472 A1 | 12/2013 | Fahlgren et al. |
| 2014/0013400 A1 | 1/2014 | Warshavsky et al. |
| 2014/0025503 A1 | 1/2014 | Meyer et al. |
| 2014/0058806 A1 | 2/2014 | Guenette et al. |
| 2014/0064467 A1 | 3/2014 | Lawson et al. |
| 2014/0072115 A1 | 3/2014 | Makagon et al. |
| 2014/0073291 A1 | 3/2014 | Hildner et al. |
| 2014/0095627 A1 | 4/2014 | Romagnino |
| 2014/0101058 A1 | 4/2014 | Castel et al. |
| 2014/0105372 A1 | 4/2014 | Nowack et al. |
| 2014/0106704 A1 | 4/2014 | Cooke et al. |
| 2014/0122600 A1 | 5/2014 | Kim et al. |
| 2014/0123187 A1 | 5/2014 | Reisman |
| 2014/0126715 A1 | 5/2014 | Lum et al. |
| 2014/0129363 A1 | 5/2014 | Lorah et al. |
| 2014/0153565 A1 | 6/2014 | Lawson et al. |
| 2014/0185490 A1 | 7/2014 | Holm et al. |
| 2014/0254600 A1 | 9/2014 | Shibata et al. |
| 2014/0258481 A1 | 9/2014 | Lundell |
| 2014/0269333 A1 | 9/2014 | Boerjesson |
| 2014/0274086 A1 | 9/2014 | Boerjesson et al. |
| 2014/0282473 A1 | 9/2014 | Saraf et al. |
| 2014/0289391 A1 | 9/2014 | Balaji et al. |
| 2014/0304054 A1 | 10/2014 | Orun et al. |
| 2014/0317640 A1 | 10/2014 | Harm et al. |
| 2014/0355600 A1 | 12/2014 | Lawson et al. |
| 2014/0372508 A1 | 12/2014 | Fausak et al. |
| 2014/0372509 A1 | 12/2014 | Fausak et al. |
| 2014/0372510 A1 | 12/2014 | Fausak et al. |
| 2014/0373098 A1 | 12/2014 | Fausak et al. |
| 2014/0379670 A1 | 12/2014 | Kuhr |

(56) References Cited

U.S. PATENT DOCUMENTS

| | | | |
|---|---|---|---|
| 2015/0004932 A1 | 1/2015 | Kim et al. |
| 2015/0004933 A1 | 1/2015 | Kim et al. |
| 2015/0023251 A1 | 1/2015 | Giakoumelis et al. |
| 2015/0026477 A1 | 1/2015 | Malatack et al. |
| 2015/0066865 A1 | 3/2015 | Yara et al. |
| 2015/0081918 A1 | 3/2015 | Nowack et al. |
| 2015/0082378 A1 | 3/2015 | Collison |
| 2015/0100634 A1 | 4/2015 | He et al. |
| 2015/0119050 A1 | 4/2015 | Liao et al. |
| 2015/0181631 A1 | 6/2015 | Lee et al. |
| 2015/0236905 A1 | 8/2015 | Bellan et al. |
| 2015/0281294 A1 | 10/2015 | Nur et al. |
| 2015/0365480 A1 | 12/2015 | Soto et al. |
| 2015/0370788 A1 | 12/2015 | Bareket et al. |
| 2016/0011758 A1 | 1/2016 | Dornbush et al. |
| 2016/0077693 A1 | 3/2016 | Meyer et al. |
| 2016/0112475 A1 | 4/2016 | Lawson et al. |
| 2016/0112521 A1 | 4/2016 | Lawson et al. |
| 2016/0119291 A1 | 4/2016 | Zollinger et al. |
| 2016/0127254 A1 | 5/2016 | Kumar et al. |
| 2016/0149956 A1 | 5/2016 | Birnbaum et al. |
| 2016/0162172 A1 | 6/2016 | Rathod |
| 2016/0205519 A1 | 7/2016 | Patel et al. |
| 2016/0226937 A1 | 8/2016 | Patel et al. |
| 2016/0226979 A1 | 8/2016 | Lancaster et al. |
| 2016/0234391 A1 | 8/2016 | Wolthuis et al. |
| 2016/0239770 A1 | 8/2016 | Batabyal et al. |
| 2017/0339283 A1 | 11/2017 | Chaudhary et al. |

FOREIGN PATENT DOCUMENTS

| | | |
|---|---|---|
| EP | 1464418 A | 10/2004 |
| EP | 1522922 A2 | 4/2005 |
| EP | 1770586 A1 | 4/2007 |
| EP | 2053869 A1 | 4/2009 |
| ES | 2134107 A | 9/1999 |
| JP | 10294788 | 4/1998 |
| JP | 2004166000 A | 6/2004 |
| JP | 2004220118 A | 8/2004 |
| JP | 2006319914 A | 11/2006 |
| WO | 9732448 A | 9/1997 |
| WO | 2002087804 | 11/2002 |
| WO | 2006037492 A | 4/2006 |
| WO | 018489 | 2/2009 |
| WO | 2009018489 A | 2/2009 |
| WO | 2009124223 A | 10/2009 |
| WO | 2010037064 | 4/2010 |
| WO | 2010037064 A | 4/2010 |
| WO | 2010040010 A | 4/2010 |
| WO | 2010101935 A | 9/2010 |
| WO | 2011091085 A | 7/2011 |

OTHER PUBLICATIONS

Archive Microsoft Office 365 Email | Retain Unified Archiving, 2015, GWAVA, Inc., Montreal, Canada. <http://www.gwava.com/Retain/Retain_for_Office_365.php>.

Twilio Cloud Communications—APIs for Voice, VoIP, and Text Messaging, Twilio. <http://www.twilio.com/docs/api/rest/call-feedback>.

Complaint for Patent Infringement, *Telinit Technologies, LLC* v. *Twilio Inc.*, dated Oct. 12, 2012.

Kim et al. "In-service Feedback QoE Framework" 2010 Third International Conference on Communication Theory. Reliability and Quality of Service. pp. 135-138. 2010.

Matos et al. "Quality of Experience-based Routing in Multi-Service Wireless Mesh Networks" Realizing Advanced Video Optimized Wireless Networks. IEEE pp. 7060-7065. 2012.

NPL, "API Monetization Platform", 2013.

RFC 3986: Uniform Resource Identifier (URI): Generic Syntax; T. Berners-Lee, R. Fielding, L. Masinter; Jan. 2005; The Internet Society.

Subramanya, et al. "Digital Signatures", IEEE Potentials, Mar./Apr. 2006, pp. 5-8.

Tran et al. "User to User adaptive routing based on QoE" ICNS 2011: The Seventh International Conference on Networking and Services. pp. 170-177. 2011.

Wu et al. "Quality Evaluation in Peer-to-Peer IPTV Services" Data Traffic and Monitoring Analysis, LNCS 7754. pp. 302-319. 2013.

"Ethernet to Token ring Bridge"—Black Box Corporation, Oct. 1999 http://blackboxcanada.com/resource/files/productdetails/17044.pdf.

S. barakovic and L. Skorin-Kapov. "Survey and Challenges of QoE Management Issues in Wireless Networks". 2012, pp. 1-29.

\* cited by examiner

Endpoint Configuration

| Request Resource: | <Customer_Domain or ApplicationURI> |
|---|---|
| Fallback Resource: | <Customer_Backup_Domain or Backup_ApplicationURI> |
| Status Callback Resource | CallbackURI |
| Record | ☑ |

FIGURE 12

Call Blast

| | |
|---|---|
| Enter numbers you'd like to call. The first one to answer is connected. | |
| IP PBX Domain | <IP_PBX_domain> |
| Phone numbers | <number1> |
| | <number2> |
| | <number3> |

Signaling Application Module Endpoint

| | |
|---|---|
| Copy the SIPlet into your phone number configuration or when making an outgoing call. | |
| SIPlet signaling application identifier | <number1>+<number2>+<number2>+<IP_PBX_domain>@parallel.example.com |

FIGURE 13

SYSTEM AND METHOD FOR INTEGRATING SESSION INITIATION PROTOCOL COMMUNICATION IN A TELECOMMUNICATIONS PLATFORM

CROSS-REFERENCE TO RELATED APPLICATIONS

This application is a continuation of prior U.S. application Ser. No. 14/208,920, filed on 13 Mar. 2014, which claims the benefit of U.S. Provisional Application Ser. No. 61/783,134, filed on 14 Mar. 2013, all of which are incorporated in their entirety by this reference.

TECHNICAL FIELD

This invention relates generally to the telecommunications platform field, and more specifically to a new and useful system and method for integrating session initiation protocol communication in a telecommunications platform in the telecommunications platform field.

BACKGROUND

Session Initiation Protocol (SIP) is a signaling protocol often used in establishing communication sessions. Such communication sessions can include voice, video, messaging, and other forms of communication. SIP is meant to be an application layer that is independent of the transport layer. Working with SIP to build applications and provide services may require a specialized skill set, and building applications on top of SIP may be challenging for some developers. In some cases, setting up a SIP endpoint may pose challenges to those hoping to do so quickly and easily. Thus, there is a need in the telecommunications platform field to create a new and useful system and method for integrating a session initiation protocol communication in a telecommunications platform. This invention provides such a new and useful system and method.

BRIEF DESCRIPTION OF THE FIGURES

FIG. 12 is a schematic representation of an exemplary screenshot of a account routing configuration panel;

FIG. 13 is a schematic representation of an exemplary screenshot of a form to create a signaling and media endpoint with embedded parameters for a signaling application module;

FIG. 22 is a sequence flow diagram of one variation of upgrading a basic communication through a REFER to a public-SIP-in;

DESCRIPTION OF THE PREFERRED EMBODIMENTS

The following description of preferred embodiments of the invention is not intended to limit the invention to these preferred embodiments, but rather to enable any person skilled in the art to make and use this invention.

1. System for Integrating Session Initiation Protocol in a Platform

Figure 1:
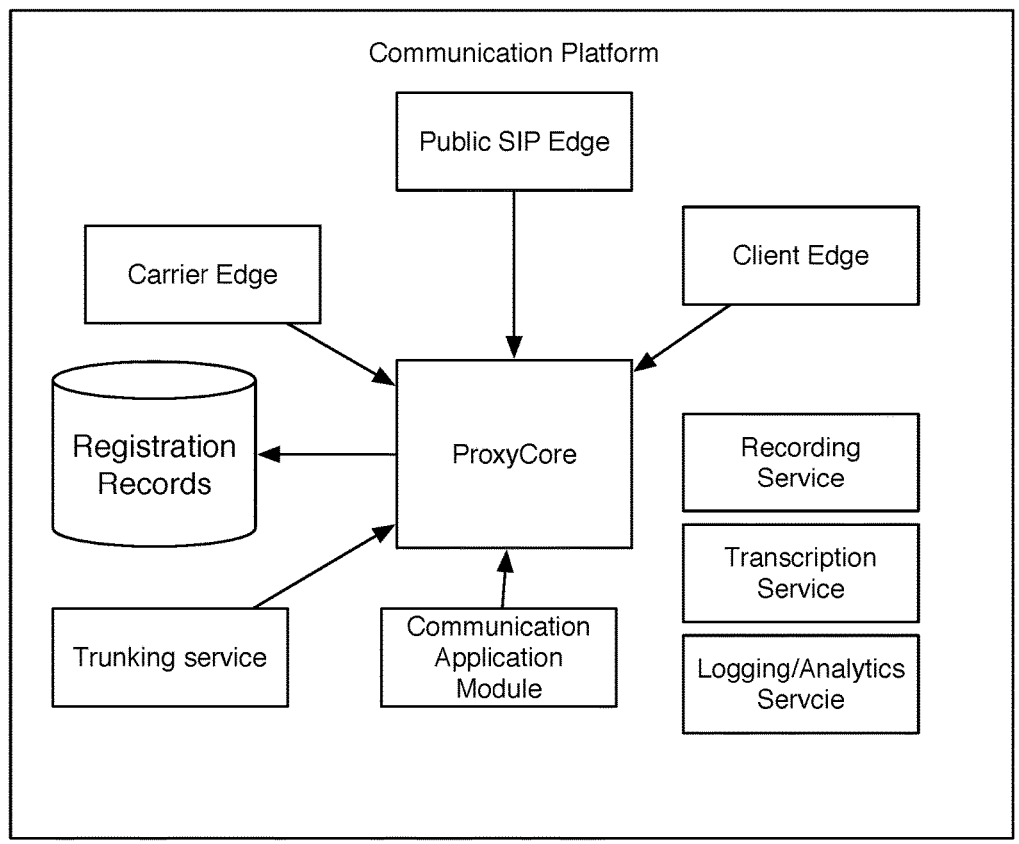
FIG. 1 is a schematic representation of a system of a preferred embodiment.

As shown in FIG. 1, a system for integrating session initiation protocol communication in a telecommunications platform is preferably a communication platform facilitating at least bridging communication endpoints through a signaling and media protocol in combination with dynamic programmatic responsive mechanisms. The communication platform is preferably a system substantially similar to the telephony platform described in U.S. patent application Ser. No. 12/417,630 filed 2 Apr. 2009, which is incorporated herein in its entirety by this reference. Herein, SIP is used in describing the signaling and media protocol, but any suitable protocol may alternatively be used in place of SIP. The system preferably functions to bridge signaling and media traffic with application layer interactions. Combining SIP-based communication with HTTP callbacks (or other suitable form of application layer callbacks) can enable a HTTP request/response application model in supplementing SIP communications with information and/or logic. The system can provide SIP trunking (e.g., originating and/or terminating variations), and logic can be integrated into the communication flow in a dynamic and customizable manner. Preferably, SIP data and/or other parameters from the communication session can be passed as parameters in the HTTP request transmitted to the callback resources, which can then track, react to, and/or alter the state of the communication session. Other parameters set within an account record, through an API request, embedded in the signaling communication can be used to enable various features and/or responses to the communication.

The system can be distributed across multiple regions. Each region can include carrier edge services, public SIP edge services, client edge services, a proxy core service, a trunking application, and optionally a communication application service. The system is preferably a multitenant platform wherein a plurality of different distinct users/accounts operates within the same infrastructure of the system. The system can include an account system, a billing system, and additionally services or components to facilitate other features and capabilities of the system. For example, the system can include event logging system, analytics system, recording services, conferencing services, communication queues, text-to-speech (TTS) services, transcription services, and/or any suitable component. A carrier edge service preferably functions to route all traffic to and from a carrier. An edge can be defined as a load balancer and a session-border-controller. A public SIP edge service preferably functions to route all traffic to and from a public SIP endpoint (trunking and non-trunking). A client edge service preferably functions to route all traffic to and from client applications of the communication platform (e.g., web applications or applications using SDK to interface through SIP with the communication platform).

The proxy core is preferably a component that manages/touches traffic of the communication platform as a communication router. The proxy core functions to making routing decisions for incoming and outgoing communications. For an incoming PSTN call (from a carrier to the carrier edge service to the proxy core), the proxy core determines if this is a trunking use case or an application use case. If a trunking use case, the proxy core signals to the trunking application. If an application use case, the proxy core signals to a communication application service. The use case is preferably determined based on the mapping of the destination number to a routing configuration identifier (e.g., a SIP address or an application URI). The proxy core additionally includes a callback engine that monitors SIP transaction messages and can initiate request response interactions with a callback resource over an application layer protocol in response to signaling and/or media events. Callback URIs are preferably configured for the communication platform through an API, a control user interface, or any suitable control mechanism. The communication platform may additionally include a registration record database. The registration record database is preferably used in maintaining routing information for devices that register a communication endpoint with the communication platform.

A trunking application functions to implement trunking functionality such as taking care of REFER SIP messages. In some implementations, the system can include communication application service. The communication application service preferably provides a higher level of communication applications such as voice based applications to play recordings, perform TTS, capture input caller, record messages, connect other endpoints, or control any suitable interaction during a communication session. Preferably the communication application service can function substantially similar to a call router that processes a document of telephony instructions such as in U.S. patent application Ser. No. 12/417,630.

The system can be operated to provide variety of different features. The system as one aspect can include registering and triggering callback resources, which function to make SIP trunking sessions reactive to signaling and media events. As another aspect, the system can use a unified registration system so that a phone number (or other suitable endpoint identifier) can be configured to perform trunking or run a communication application; further, fallback/error responses can be defined for either trunking or application execution. For example, the system can enable a SIP-URI to be associated with a phone number as a main mechanism for communication, but if the communication does fail, a failure callback can specify an application resource or another SIP-URI. In the case of a SIP-URI, the call can failover to the secondary SIP domain for trunking. In the case of an application resource (e.g., preferably specified as a URI of an application resource), then that application can be executed. Such a unified communication endpoint registration can similarly be used where an incoming call is initially handled by an application and fails over to a SIP-URI. As an example, a customer may have capacity for a set number of concurrent phone calls, and when the customer hits that limit, the system can automatically handle the overflow in accordance to the fallback resource. In this example, the unified registration for a number +1-415-555-1234 can have an incoming resource set as "sip:pbx.example.com" and a fallback callback as http://example.com/sorry.xml". Then if the SIP server at sip:pbx.example.com is busy and responds with an error response, the system can access the fallback callback application. That callback application could play an error message or place in a queue until an agent is available or any suitable application logic.

Similarly, select media features such as recording may be enabled during a trunking communication session. An additional aspect can enable a communication session to dynamically transition between operating modes where a communication session may be established in a low-level trunking mode and then elevated to enable application processing or other media features. Operational mode transitioning can provide better use of resources and possibly allow customers to selectively reduce account usage (and consequently lower platform cost). As another element of the system, a signaling application module can function to provide customizable signaling endpoints wherein a signaling application module will extract and use embedded data of the endpoint identifier to alter signaling. The system is preferably configured to perform any suitable combination and/or subset of processes of the methods described above.

2. Session Initiation Protocol Communication in a Platform

Figure 2:
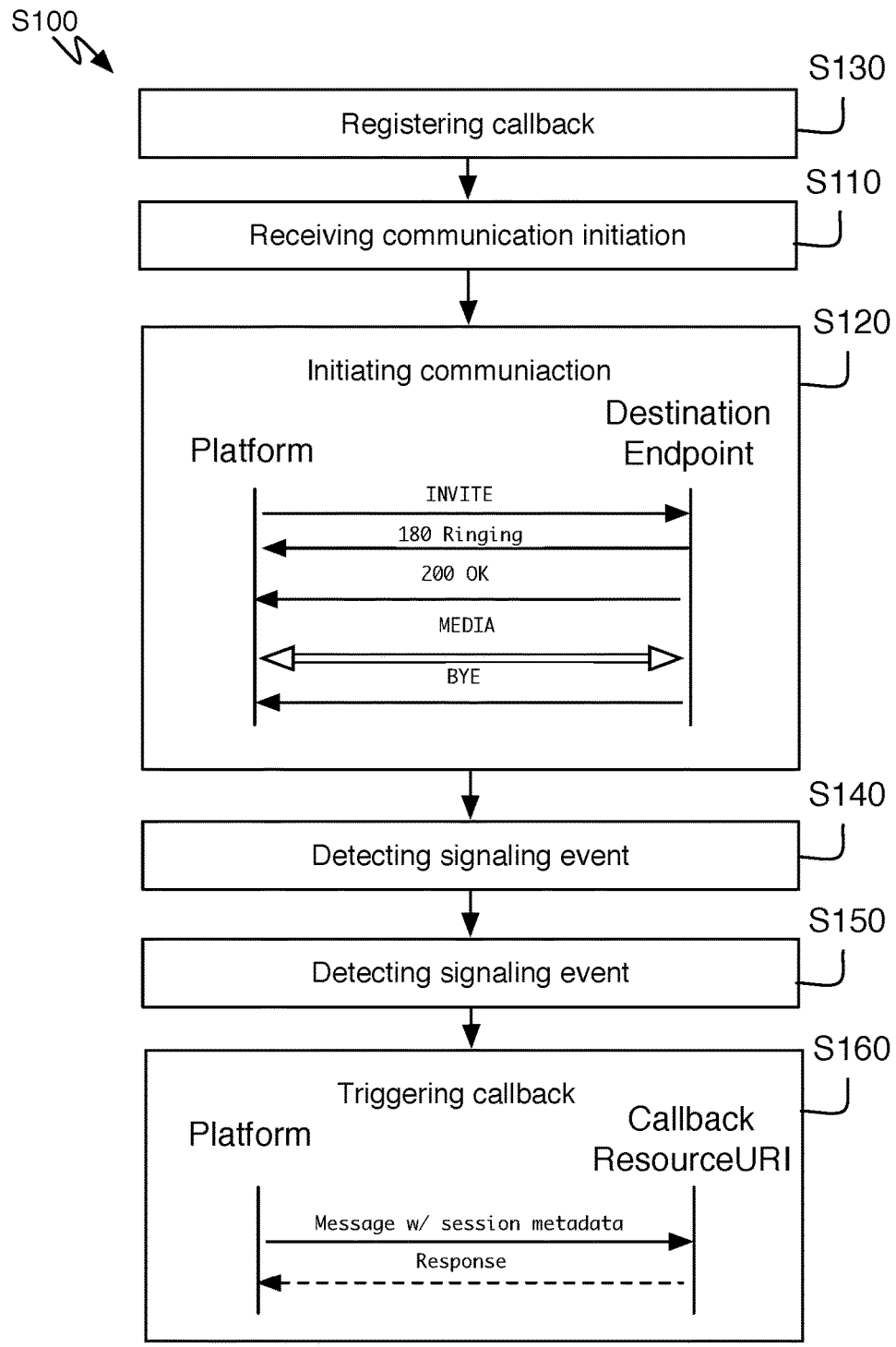
FIG. 2 is a flowchart representation of a method of a preferred embodiment.
Figure 3:
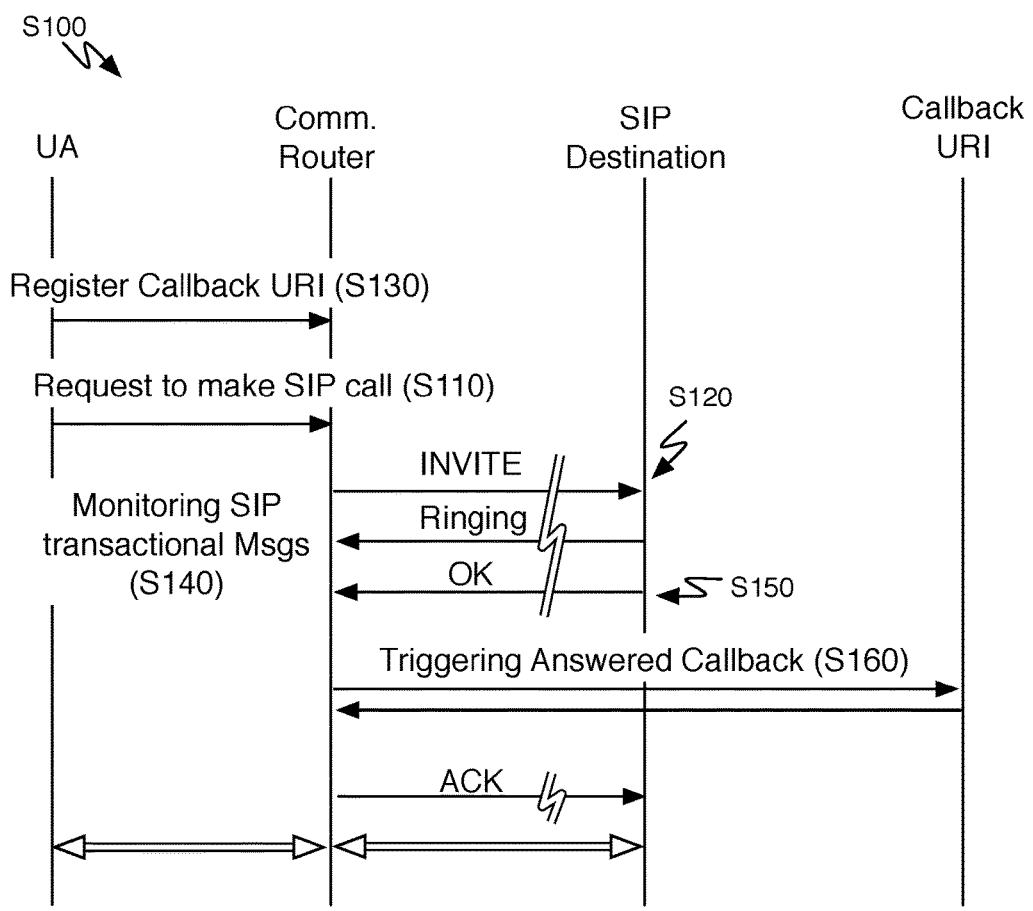
FIG. 3 is sequence flow diagram of a method for implementing outbound SIP communications of a preferred embodiment.

As shown in FIG. 2, a method S100 for integrating session initiation protocol communication in a telecommunications platform of a first preferred embodiment can include receiving an outgoing communication request to a resource S110, establishing signaling and media communication in a session S120, registering a callback resource to a signaling event of the session S130, monitoring signaling messages of the session S140, detecting the signaling event in the signaling messages of the session S150, and triggering the callback resource upon detecting the signaling event S160. The method functions to bridge signaling and media traffic with HTTP as shown in FIG. 3. The method is preferably used in communications using SIP as a communication protocol but may alternatively be used in any suitable signaling and media communication protocol. Combining SIP-based communication with HTTP callbacks can enable a HTTP request/response application model in supplementing SIP communications with information and/or logic. Preferably, SIP data and/or other parameters from the communication session can be passed as parameters in the HTTP request transmitted to the callback resources, which can then track, react to, and/or alter the state of the communication session. The method is preferably implemented within a multitenant communication platform. The callback resources configuration is preferably stored and maintained for a plurality of accounts and/or sub-accounts.

The method can be applied to several different signaling and messaging use cases and communication topologies.

Figure 4:
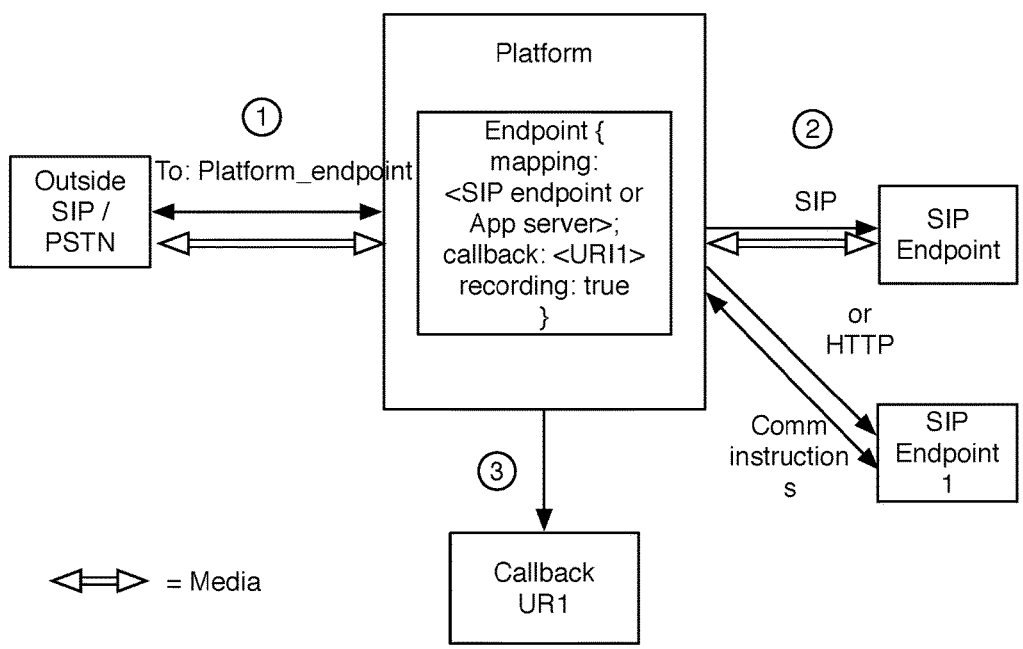
FIG. 4 is a schematic representation of a variation of outside communication to a platform endpoint being mapped another endpoint.
Figure 5:
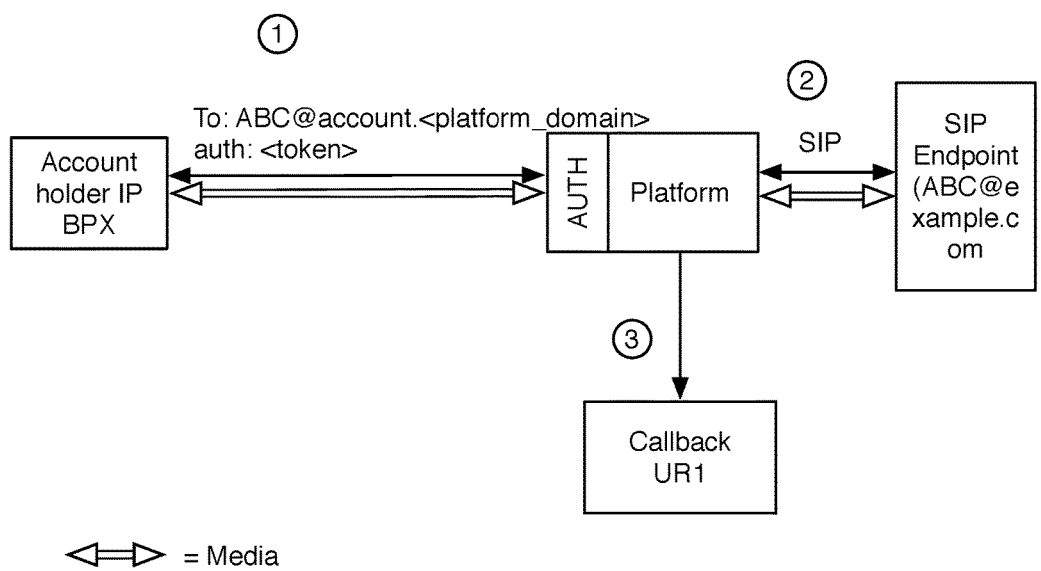
FIG. 5 is a schematic representation of an account holder directing outbound communication through the communication platform.
Figure 6A:
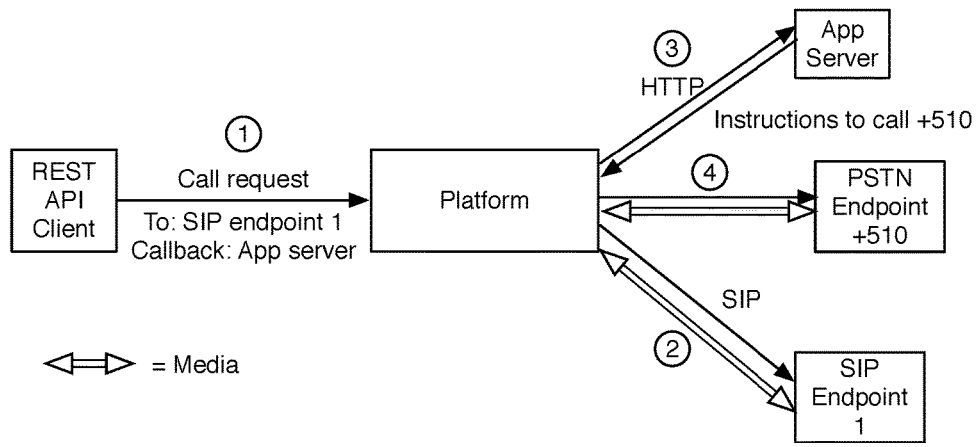
FIGS. 6A and 6B are schematic representations of an exemplary use of establishing a communication session from an application programming interface call.
Figure 6B:
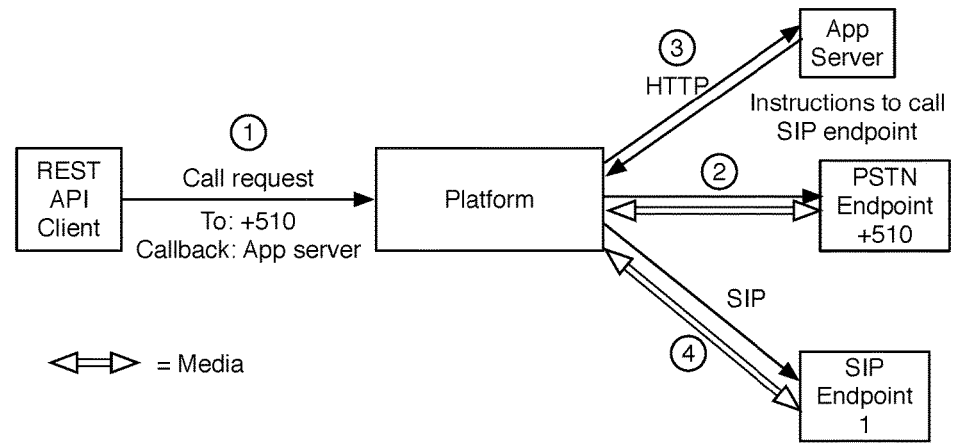

The method can be applied to terminating and originating SIP trunking scenarios. In the terminating use case described in more detail below, the call could originate from a PSTN endpoint, an outside SIP endpoint, an internal SIP endpoint, or any suitable type of endpoint. The terminating endpoint preferably depends on mapping of a destination endpoint to a SIP endpoint as shown in FIG. 4. The originating use case can allow account holders to make outbound SIP communication requests through the communication platform in association with their account. Originating outbound communication requests can include a layer of authentication to facilitate interfacing with outside endpoints on behalf of an account as shown in FIG. 5. Furthermore, there can be translation between the specified destination and the actual intended destination endpoint. In yet another variation, the signaling and media communication can be initiated through an API request, and the callback can be triggered during a signaling event between the communication platform and a communication endpoint. In one example, shown in FIG. 6A, an API request could initiate a call to a SIP endpoint (stages 1 and 2 in FIG. 6A); the signaling event of someone answering could result in retrieval and processing of callback resource that instructs the call to connect to another endpoint (e.g., a PSTN endpoint in the example of FIG. 6A). This API variation could similarly be applied in initially calling a PSTN number and connecting a SIP endpoint as shown in FIG. 6B. Such use cases may be applicable in connecting a customer and a customer service agent in response to an interaction on a website or mobile app.

Figure 7:
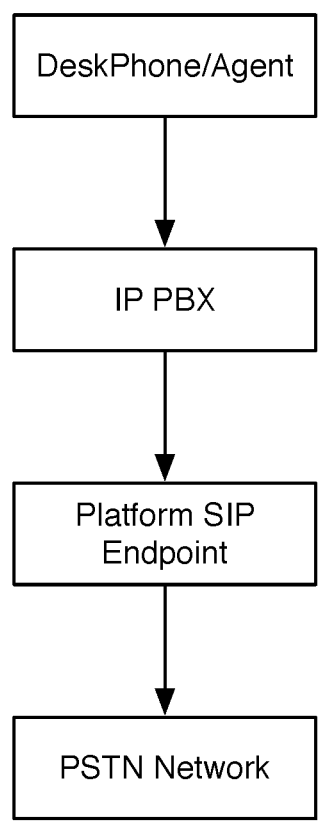
FIG. 7 is a schematic representation of communication nodes in a terminating use case.
Figure 8:
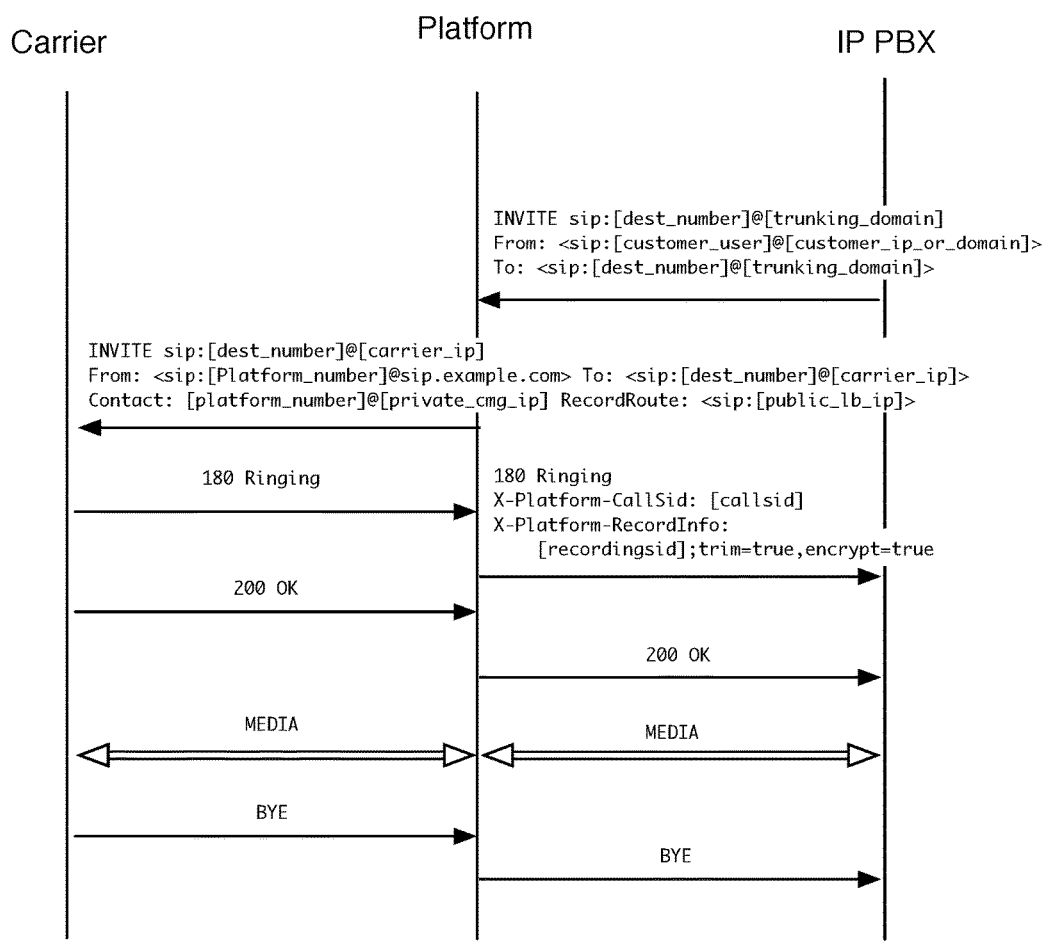
FIG. 8 is a detailed sequence flow diagram of a terminating use case.
Figure 9:
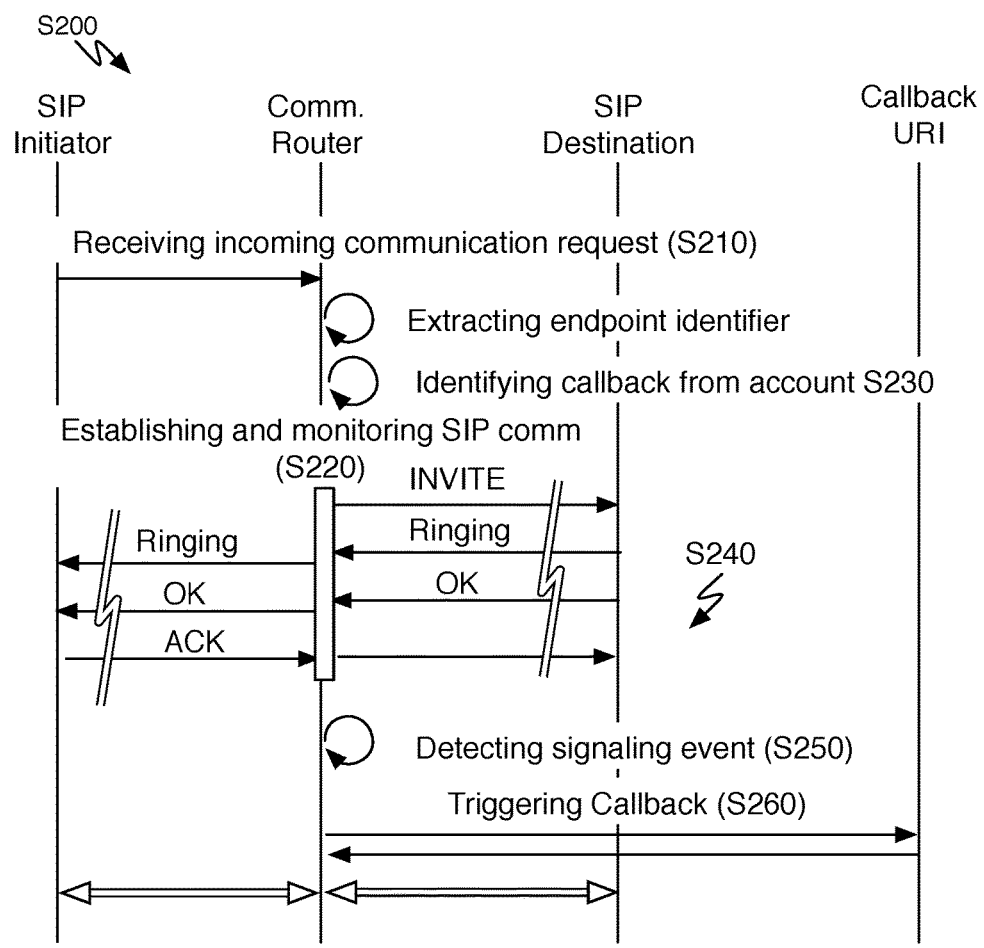
FIG. 9 is sequence flow diagram of a method for implementing inbound SIP communications of a preferred embodiment.

Block S110, which includes receiving a communication request to a resource, functions to prompt, start or initiate a communication session. The resource in one variation can be to an endpoint with an account routing configuration (e.g., outside entities make a call into the communication platform). This variation will be discussed in more detail in method S200. The resource may alternatively be directed to an outside endpoint through the communication platform (e.g., PBX of an account holder sending an INVITE to 415-xxx-xxxx@<accountID>.<platform_domain> to make an termination trunking call to 415-xxx-xxxx). The request preferably includes a specified destination. The communication request can be received as a signaling message directed at a domain of the platform, where the signaling message is requesting to establish a media communication session with a communication endpoint. The outgoing communication request can be received as the platform facilitates SIP trunking termination. For example, a customer could be enabled to use a desk phone or a call center workstation behind an IP PBX to make a call to a cell phone or landline as shown in FIG. 7. When using SIP, the signaling message may be an INVITE, a REFER, or other suitable type of signaling message. The signaling message can originate from an IP public branch exchange (PBX) system that can reside off-premise (e.g., on-premise at a customer's infrastructure) as shown in FIG. 8. Alternatively, an IP PBX system can operate within the platform on behalf of one or more accounts. The signaling message can include an authentication token. An authentication token could be account credentials, an HMAC, a signed data package, or any suitable token used in verifying authenticity of the message. In one variation, authentication tokens can be passed through header parameters of the SIP request. Alternatively, receiving an outgoing communication request can include identifying an account of the communication platform that is mapped to a domain identifier of the originating endpoint (e.g., the domain of the SIP address) or the originating IP address. The credentials can be authenticated and verified as a request made on behalf of an account. If the credentials are successfully verified, the platform can establish media communication with the destination of the outgoing communication. The outgoing communication request can additionally include feature headers that specify communication features such as analytics, recording, media processing, transcription, or other suitable media properties. The outgoing communication request can additionally specify a callback resource to register for the session.

An outgoing communication may alternatively be initiated in response to an application programming interface (API) request of a telecommunications platform. The API request is preferably transmitted on behalf of an associated account and received at an API service of the platform. For example, an application or outside entity may make an API request to the communications platform to make an outgoing SIP based call. The outgoing communication may additionally be initiated from a telephony instruction in a communication application. In this use case the communication session is established between the communication platform and the destination endpoint. The callback resource may be used in detecting when the call is answered and beginning application execution or connecting to another endpoint. Though, an API request may be made to connect multiple endpoints.

The communication request is preferably for establishing an audio session between at least two parties. In one variation, the two parties can be the communication platform and a specified signaling and media endpoint. In another variation, the two parties can be the caller/originating endpoint and a destination endpoint. The destination endpoint may be specified in the request. The outgoing communication may alternatively establish a video session, a chat messaging session, an application communication session (e.g., a multi-player gaming session), screen sharing session, multimedia session, presence information session, or any suitable application of a communication session. Once instructions have been processed instructing a communication router to establish an outgoing communication, the communication router will preferably make an outgoing INVITE SIP request to a specified endpoint. Alternatively, the request may be a REFER SIP request or any suitable SIP request. The method may alternatively or additionally be used with other protocols for establishing a session.

Block S120, which includes establishing media communication in a session, functions to initiate, bridge, or connect an originating endpoint with a destination endpoint. The destination is preferably defined by the username identifier of the destination endpoint. The destination endpoint will preferably be another telephony endpoint such as a phone number, which will be connected through PSTN. A carrier can be selected and used to establish a media communication with the phone number. Alternatively, the phone number could be an alternative endpoint identifier wherein the media connection is established with a proxy signaling and media service of that alternative mode of communication. In yet another variation, the phone number of alternative endpoint identifier may be destination registered within the platform, wherein the method below for incoming communications may be used to establish the media communication with another SIP user agent. Once instructions have been processed instructing a communication router to establish an outgoing communication, a communication router will preferably make an outgoing INVITE SIP request to the specified destination endpoint. Alternatively, the request may be a REFER SIP request or any suitable SIP request. The method may alternatively or additionally be used with other protocols for establishing a session. If multiple endpoints are defined and do not have an established signaling and/or media connection, multiple endpoints may be contacted and included in the media communication.

Block S130, which includes registering a callback resource to a signaling event of the session, functions to associate, instantiate, or create a webhook, reactive resource, or event handler that is notified as a result of session messages, signaling patterns, and optionally media events. The registration of a callback resource preferably includes receiving a specified callback URI to associate with communication events. The callback resource may be set for an account, for a sub-account, for an endpoint, for a particular pattern of communication sessions, for a particular instance of communication (e.g., for the specific outgoing communication session) or for any particular categorization of communication sessions. A unique callback resource can be specified for a specific event. The specific event is preferably a type of signaling message, which may be the classification of the signaling message (e.g., INVITE, Ringing, 200 OK, BYE, etc.). The type of signaling message can alternatively be a pattern that can be defined by the parameters of a signaling message. For example, any SIP INVITE to an address with a particular area code in the user field of the 'to' field. A signaling event may also be defined by a set of different signaling patterns either generated by the communication platform or received from an endpoint. For example, a signaling event of hang-up could be triggered from the BYE message and/or a timeout in the signaling/media. Multiple callback resources can be registered to handle different types of signaling messages and/or to handle callbacks with different scopes (e.g., one callback scoped for all sessions made in association with an account and a second callback scope for a particular session instance). A multi-purpose callback resource may alternatively be specified, which can be a callback resource to handle callbacks for a variety of callback events. An end user (e.g., an outside developer) can configure the multi-purpose callback resource to parse parameters passed in to the callback resource so as to handle different events. In one exemplary implementation, the callback resource can be used in a SIP-based voice session and be triggered based on call events such as call starting, ringing, pickup, answering machine, hang up, DTMF input, and/or any suitable event of SIP-based voice sessions. Callback resources may alternatively be registered for any event of any suitable type of communication session. The callback resource may additionally be shared between other modalities of communication. For example, a callback URI may be registered for voice session initiation for PSTN voice calls and for SIP-based voice calls. The callback resource is preferably stored in a table mapping the callback resource to an account identifier, an application identifier, and/or an endpoint identifier.

The callback resource may be registered through an administrator control panel interface, through an API, in headers of an outgoing communication request, in the parameters of an outgoing communication instruction, or in any suitable location. In one instance, an outgoing communication request includes a parameter that defines the callback resource. The parameter can specify a callback resource URI or other suitable identifier and optionally a signaling event definition. In another instance, during a session, a signaling message can be received that includes a parameter defining the callback resource, wherein registering a callback resource comprises registering the callback resource according to the parameter in the signaling message. Accordingly, signaling messages can be processed to identify callback resource registration. In another instance, during the session, an API communication can be received that identifies the session and specifies a callback resource to register for a signaling message type. In another instance a callback resource is registered according to account settings associated with the account making the outgoing communication. Account settings can be set through an administrator control panel or through any suitable interface.

Other resources may additionally be configured for an account or an endpoint to promote robust SIP communication. A fallback URI may be configured to use if an application URI and/or a callback URI fails. A lost connection configuration may specify how a call is handled if a call is dropped. A lost connection configuration may direct the call to an error handling application URI (e.g., to read an error message and provide options). A lost connection configuration may alternatively specify actions to be taken to reestablish the connection.

Block S140 and S150, which include monitoring signaling messages of the session and detecting the signaling message type in the signaling messages of the session, function to process signaling and media transactions of the communication session. The communication messages made by a user agent client (e.g., the caller) or a user agent server (e.g., the callee) are preferably monitored. If a communication router detects a communication that has an associated callback resource, the callback resource is preferably triggered. The SIP communication may be monitored for a Trying message, Ringing (e.g., call is ringing), OK (e.g., answered), Bye (e.g., hang-up) and/or any suitable type of message. The transactional messages of SIP are preferably used to bridge SIP communications to HTTP based world.

Step S160, which includes triggering the callback resource upon detecting the signaling message type, functions to notify, message, or signal to a callback resource that an event has occurred. Triggering of a callback resource preferably enables evented web functionality with SIP communication. Preferably, an application layer communication (e.g., an HTTP request) is made to a configured callback resource URI. The callback resource URI is preferably a resource external to the platform and often controlled and/or operated by the account holder (though the callback resource URI can reasonably be a service operated by any suitable entity). The callback resource may alternatively be hosted and triggered using any suitable protocol. Additionally, communication to a callback resource can be annotated with session metadata such as SIP specific data associated with the session. Preferably, SIP data and/or other parameters from the communication session are passed as parameters in the HTTP request transmitted to the callback resource. For example, header fields of SIP transaction messages may be passed as parameters to the callback resource. The response from a callback resource may be used in the processing and handling of the communication session. For example, the callback resource may supply communication instructions to redirect the call, to hang-up, to record a conversation, to transcribe a conversation, or to perform any suitable action.

The use of callback resources preferably enables SIP-based communication sessions to follow a HTTP request/response application model that many developers are familiar with from web development experience. In one variation, the callback resource is triggered and takes appropriate action external to the platform. A simple acknowledgment of being triggered may be returned to the platform. In another variation, a callback resource can provide an actionable response. The callback resource response can include communication instructions that are processed and executed in association with the session. For example, a response may be returned with telephony instructions that connect the session to another endpoint, enable media processing features, alter operating mode, execute telephony instructions, or direct any suitable form of action with the session.

As one exemplary use of the method, a SIP based communication session may be established through an implementation of terminating SIP trunking as described above. A client agent connected through a customer's IP PBX can carry on a synchronous media communication session (e.g., voice, video, etc.) with a destination endpoint accessed over a carrier or otherwise. A callback application can be registered for the session such that the callback application is triggered on detection of a BYE signal communicated from the destination endpoint leg of the communication. When the destination endpoint hangs up, the BYE signal message is received. In response to the BYE signal message, the communication platform can transmit a communication to a URI of the callback application. The callback application can take action within its infrastructure (e.g., logging, updating status, etc.) or alternatively respond with some communication directive to alter the media and/or signaling of the session for the leg of communication with the remaining endpoints connected to the session. In one variation, the operating mode can be upgraded to enable telephony instruction processing or other suitable media features.

In addition to using callback application registration to enable signaling and media communication protocols programmable and responsive. The method may additionally include enabling media processing through signaling directives or account configuration. Media processing can include recording, transcription, and/or other suitable media processing processes that can be added on top of basic trunking or communication-bridging services. Media processing services can be enabled similar to registering a callback resource. Media processing features can be enabled through an administrator control panel interface, through an API call, in headers of an outgoing communication request, in the parameters of an outgoing communication instruction, as a parameter passed in a signaling message during a session, or in any suitable manner.

In another variation described more below, the destination SIP endpoints could be a signaling application modules that follow defined application logic in response to data embedded in the destination endpoint. For example, multiple PSTN endpoints could be included in the user field, which may be contacted in parallel or in series until one answers the communication request.

2. Inbound Session Initiation Protocol Communications

Figure 10:
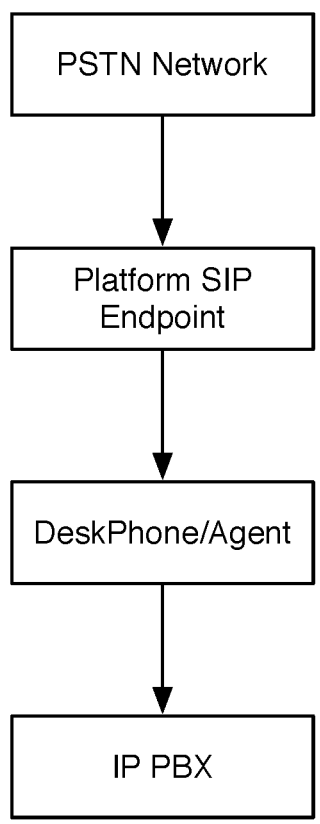
FIG. 10 is a schematic representation of communication nodes in an originating use case.

As shown in FIG. 2, a method S200 for receiving inbound SIP communication of a second preferred embodiment can include receiving an incoming communication request S210, establishing a media communication in a session according to the incoming communication request S220, registering a callback resource to a signaling event S230, inspecting communication signaling messages of the communication session S240, detecting the signaling event from the communication signaling messages of the communication session S250, and triggering the callback resource upon detecting the signaling event S260. The method of the second preferred embodiment functions to allow inbound calls or communication requests to connect to an endpoint managed by the communication platform. The inbound calls are preferably from an outside entity. In a preferred implementation, the method is used to bridge SIP communication with a HTTP request/response model as with the method of the first preferred embodiment. In alternative implementations of the method, the method may be used in transitioning between basic SIP communications and application level communications. Basic SIP communications are preferably those established through SIP trunking in an originating call flow as shown in FIG. 10. Basic SIP communications preferably provide simple communication connections (e.g., simply bridging a communication session between a SIP device and a PSTN device) with minimal or selective processing or controlling communication interactions. The method preferably provides a way to enable rich media interactions injected into lightweight signaling and media communication flows.

Block S210, which includes receiving an incoming communication request, functions to initiate communication with a destination. The destination is preferably an endpoint managed by the communication platform. The incoming communication request preferably originates from some form of originating endpoint. In one variation, the communication request is a SIP communication request. The SIP communication request preferably specifies a destination endpoint identifier. The incoming SIP request may be initiated by any suitable device or application. DNS is preferably the mechanism in which the SIP communication request is directed to the communication platform. The inbound SIP request is preferably an INVITE request to start a communication session, but the request may be any suitable initiating instruction. The INVITE request may be received from an outside carrier or communication system. A carrier may use SIP or an alterative signaling and media protocol as a mechanism for bridging PSTN initiated call to the communication platform. The carrier may alternatively be another VoIP provider. Alternatively, the INVITE request may be initiated from within the communication platform (e.g., communication between account instances). In a second variation, the communication request can be any suitable incoming communication such as a PSTN based phone call.

Figure 11:
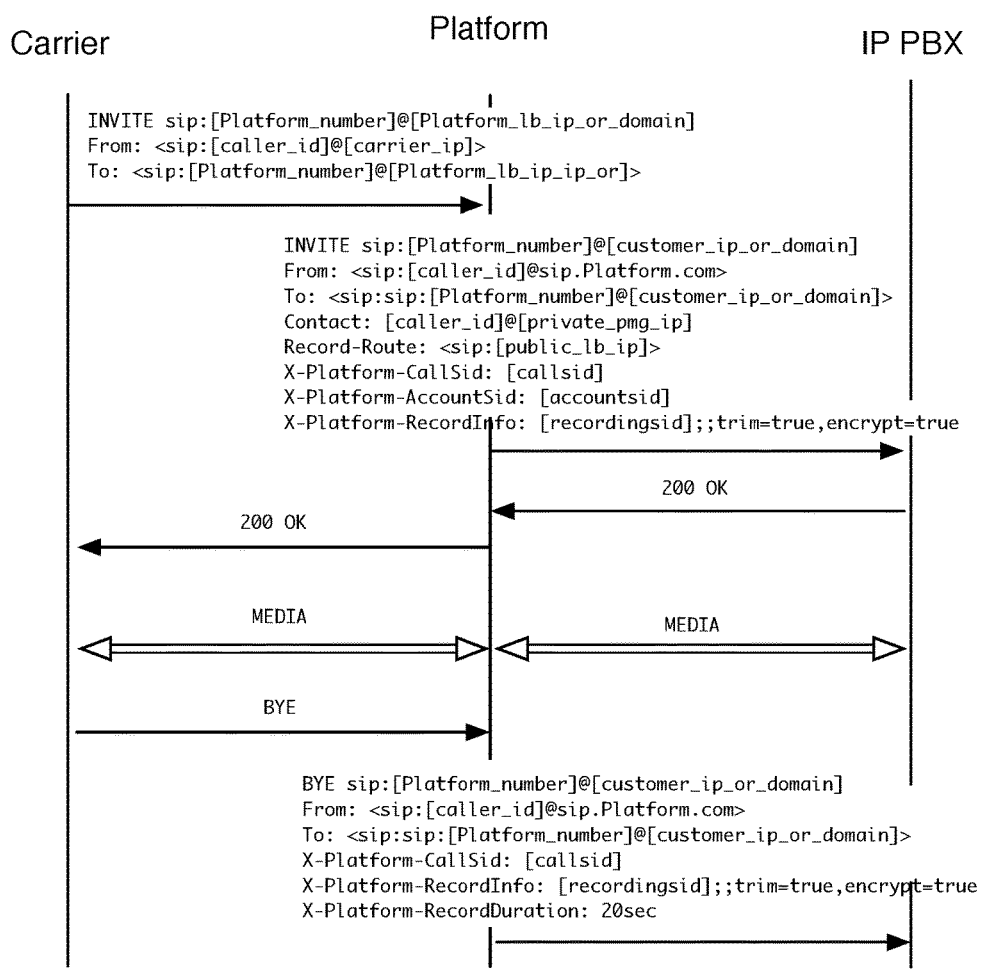
FIG. 11 is a detailed sequence flow diagram of an originating use case.

Block S220, which includes establishing a media communication in a session according to the incoming communication request, functions to initiate, bridge, or connect an incoming communication with a destination endpoint. Preferably a media communication or stream can be established through the communication platform with the initiating endpoint (i.e., caller leg) and at least one destination endpoint (e.g., callee leg). The callee is preferably a signaling and media endpoint (e.g., SIP endpoint) connected through a public branch exchange or an alternative proxy. The media may additionally be redirected through additional media services, which have been selectively enabled for the session. For example, enabling of media services such as recording, transcription, analytics, API control, and/or other media processing features may be enabled through account configuration and/or session configuration. An account holder on the communication platform can preferably configure their account and optionally an IP PBX to facilitate originating SIP trunking. As shown in FIG. 11, a carrier may direct a SIP INVITE, REFER or other initiating signaling message to the communication platform. The addressing can specify an endpoint address (e.g., phone number, shortcode, endpoint identifier, etc.) in a user field of a SIP address. The domain of the SIP address can be a domain controlled by the communication platform or otherwise redirected to the communication platform. In one implementation of the method, the endpoint address is mapped to an account. For example, an account may have one or more phone numbers registered within the communication platform. Within the account settings, the endpoint address can be mapped to a primary account routing configuration. The account routing configuration can specify a URI, domain name, or other identifier of a resource that can handle the signaling and media communication as shown in FIG. 12. The communication platform then sends an invite addressed to the endpoint address within the resource specified in the account routing configuration. For example, the domain name of the account holder's IP PBX replaces that of the communication platform in the "to" field of the INVITE request. Additionally, the caller endpoint can be used in the username of the "from" field but with a domain of the communication platform, which can function to provide an easy way to call back the caller through the trunking service of the communication platform. Media can be established between the caller and the callee through the communication platform, and subsequent signaling can be routed through the communication platform.

Block S220 can include extracting an endpoint identifier which functions to map a destination endpoint identifier with an endpoint of the communication platform. In one preferred variation, the destination endpoint identifier in a signaled communication request will include a local portion (e.g., a username or phone number) and domain portion. The destination endpoint identifier preferably maps to an endpoint record. The endpoint record is preferably a stored model of the endpoint configurations, which may be stored in association with an account or sub-account. An endpoint record will preferably store a signaling endpoint, an application URI, and/or any callback URIs. Preferably, the communication platform maintains a database table that maps account secure identifiers to signaling endpoints or application secure identifiers. A second database table may maintain a mapping of application secure identifiers to application URIs. Other tables may maintain callback URI's. In one exemplary implementation, the endpoint identifiers of the communication platform use a syntax pattern with an application secure identifier and an account secure identifier as the local portion of the endpoint identifier. An example of an endpoint identifier may be applicationSID@accountSID.example.com, where accountSID is a unique secure account identifier. The endpoint identifier is preferably specified in a header of the SIP invite, but may alternatively be conveyed in any suitable parameter. The secure account identifier may be used in determining an application URI, any callback URIs, and machine address (e.g., IP address). Any suitable pattern may be used in the endpoint identifier such that the communication platform can properly route the request. In another preferred variation, the destination endpoint may be an endpoint associated with the protocol/medium of the incoming communication. For example, an incoming PSTN phone call may be directed at a phone number destination. The communication destination may additionally or alternatively be mapped to a signaling endpoint, an application URI, and/or any callback URIs in an endpoint record.

The incoming communication may additionally be authenticated. Due to the communication platform preferably being a multitenant platform, the method preferably uses the authentication process in identifying and selecting the proper routing and application settings to use in the communication session. The authentication may be performed at the load balancer, prior to being directed to the communication router, at the communication router, or at any suitable point.

In one preferred embodiment, establishing media communication can depend on selectively routing media according to customizable mapping as shown in FIG. 12. The method S200 can include mapping a destination endpoint specified in the incoming com communication signaling request to a primary account routing configuration; if the primary account routing configuration is a signaling endpoint, establishing a media stream communication of the communication session comprises routing an invitation signal to the signaling endpoint and establishing the media stream from a originating endpoint of the incoming communication request and the signaling endpoint; and if the primary account routing configuration is an application resource identifier, establishing a media stream communication of the communication session comprises retrieving and processing an application specified by the application resource identifier to direct the media stream. The customizable mapping functions to enable a communication platform to provide a unified endpoint configuration system where an endpoint can be configured to be routed directly to a communication endpoint or to a communication application with enhanced media processing. In this embodiment a destination endpoint identifier can be selectively invoke different behavior for different accounts. For example, some accounts would want an endpoint to initially route to a SIP phone while other accounts may want a telephony application to handle an inbound call. Additionally, the customizable mapping can include a secondary account routing configuration wherein upon detecting an error or other suitable communication event, establishing media communication according to the secondary account routing configuration. The primary routing configuration and the secondary account routing configuration could be a signaling communication endpoint such as a SIP address or domain name for an IP PBX resource or an application URI. In one account instance, an incoming call may be initially handled by a communication application and if that fails, fallback to connecting a SIP endpoint; while in another account instance, an incoming call can be connected to a SIP endpoint, and if that fails, fallback to a communication application (e.g., instructing a text to speech service to announce an error and instruct the caller to callback later). In other account instances, the primary and secondary routing configurations may both be signaling endpoints or both be communication applications.

In the variation, where the account routing configuration includes a signaling endpoint, establishing media communication can include establishing media communication from the originating endpoint to the destination of the signaling endpoint. For example if the signaling endpoint is "sip:pbx.example.com" and the call was to "sip:<phone_number>@<platform_domain>" then the destination connected for media communication can be "<phone_number>@pbx.example.com". In one variation, two endpoints are connected for voice, video, screen-sharing, or other suitable form of a synchronous/real-time communication.

In a related variation, the destination signaling endpoint could be a signaling application module that follows defined logic in response to data embedded in the signaling endpoint stored in the account routing configuration. If the signaling endpoint is a signaling application module, the communication platform preferably routes the message according to the signaling endpoint logic above, but a signaling application module (a signaling and media proxy server) receives the communication request the invite is processed. Accordingly, the method can include routing to a signaling application module; at the signaling application module coordinating signaling with the signaling endpoint in accordance with the metadata. In this variation, the signaling endpoint includes metadata embedded in the endpoint identifier, and the signaling application module is additionally identified.

Figure 14:
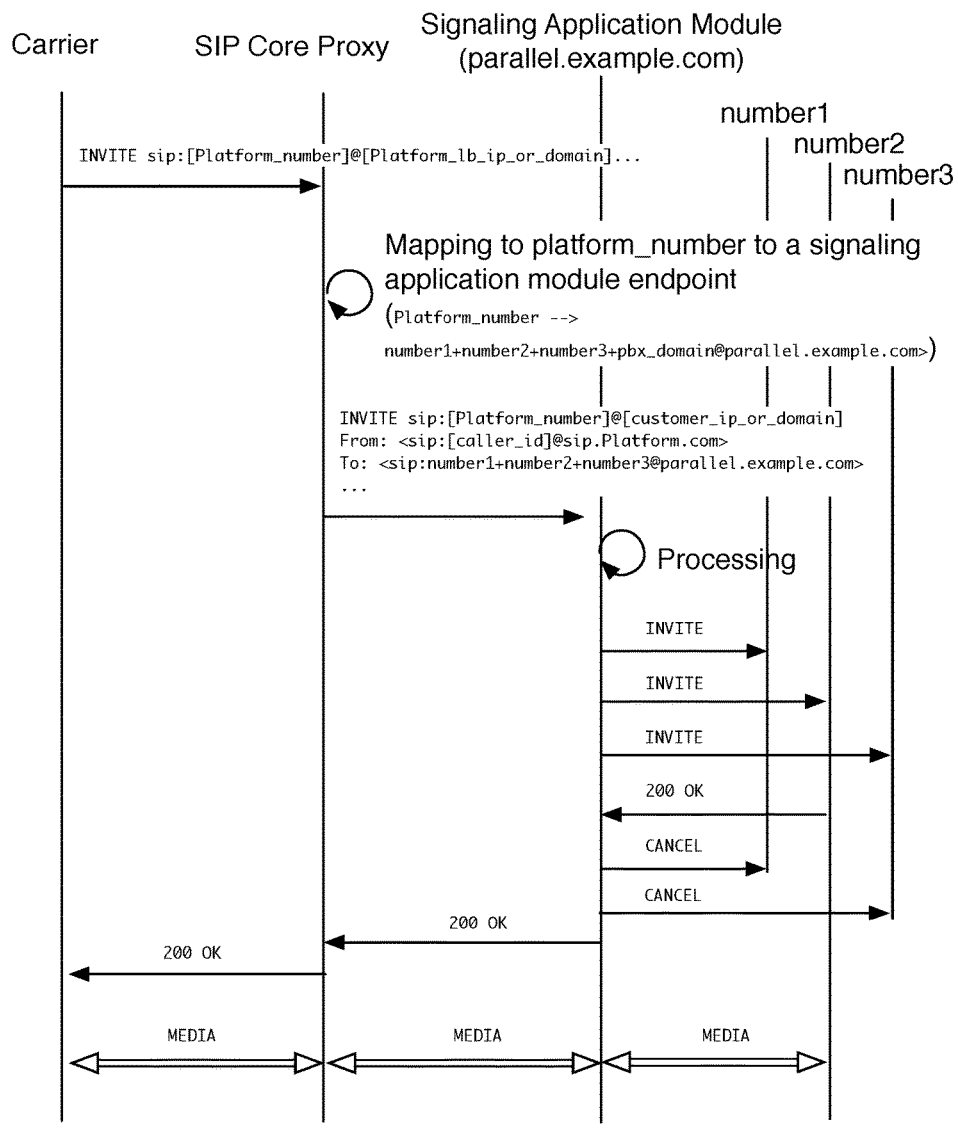
FIG. 14 is an exemplary application of a signaling application module.

The signaling application modules are preferably hosted and provided by the communication platform, but outside entities could similarly host and operate the signaling application modules. A signaling application module can preferably be referenced as part of a signaling endpoint identifier. Parameters that define functionality of the signaling application module are additionally a part of the signaling endpoint identifier. A signaling application module preferably functions to provide a defined set of functionality that is commonly implemented for many users. A signaling application module could be defined to set up a conference call of multiple signaling endpoints, to call a set of endpoints in parallel and only connect the first one to pick up, to call a set of endpoints in series one after the other, and/or to serve any suitable use case. A web form or other suitable application can be used by a user to input the parameters of a particular signaling application module instance, and the form outputs a signaling endpoint with the parameters appropriately embedded in the address as shown in FIG. 13. Additionally or alternatively, a library could be provided that includes a function to facilitate generating a signaling endpoint with the parameters appropriately embedded. The library may be used in making outbound calls in method S100. For example, a signaling application module that calls a set of numbers in parallel may be generated to call three numbers in parallel and have a signaling endpoint of the pattern "<phone_number1>+<phone_number2>+<phone_number3>@parallelexample.com", as shown in FIG. 14. The syntax of the signaling endpoint and embedded parameters can be any suitable syntax. An INVITE or other communication initiation communication is preferably delivered to a resource of the signaling application module. At the resource of the signaling application module, the signaling endpoint is parsed, interpreted, and applied in signaling and media logic. In the above example, the three numbers are extracted and then used as inputs to application logic that calls a set of endpoints in parallel. Signaling application modules can be used in method S100 or in method S200.

In an alternative variation, an incoming SIP communication request may specify communication application instructions within the SIP request. In one preferred implementation, SIP request headers can specify SIP communication instructions. Communication instructions embedded in the SIP request function to enable an application to be defined specifically for an incoming SIP call. The communication instructions may alternatively be specified in the body of the SIP request or in any suitable portion of the request. The request can preferably enable application control without configuring an application, because communication instructions can be configured directly in the SIP request. For example, a SIP request may enable one or more communication features of the communication platform by including the appropriate directives in the header of the SIP request. Using SIP request instructions may function to alleviate the system from providing full application stack support for the communication if the desired features for the communication are limited.

Figure 15:
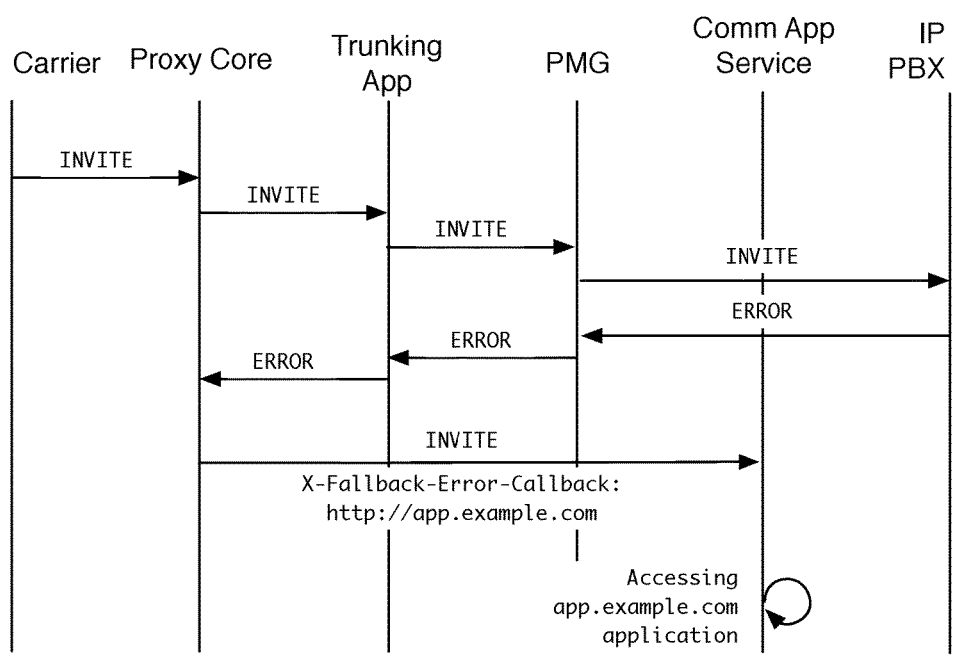
FIG. 15 is a sequence flow diagram of an exemplary use of a callback for error handling

In the variation, where the account routing configuration includes a application resource identifier establishing media communication can include retrieving a communication application specified by the application resource identifier, which functions to send the request to an application server. A proxy core server preferably invites an application processing server (e.g., a call router), which then retrieves and executes communication application instructions. Retrieving a communication application can additionally be in response to the registered callback resource or optionally the secondary routing configuration used in error handling as shown in FIG. 15. The application server preferably hosts or generates application logic that can instruct the communication platform how to process, handle, or route the incoming communication request. A communication application is preferably a remotely hosted resource that can be accessed over HTTP, SPDY, alternative application layer protocol, or any suitable network protocol. Alternatively, a communication application may be hosted locally, within the communication platform, or accessed over any suitable protocol. Preferably, a request is sent to an application URI and, more preferably, the request is sent to a URI mapped to the endpoint identifier. An application server is preferably a third party server and, more preferably, the server is hosting a web application. The request is preferably sent to a server over a network. In one variation, the request is sent to a local server on a local area network. In yet another variation, the request may be sent to multiple servers. The request preferably encapsulates at least a portion of the state information from the communication request, such as the originating endpoint, the destination endpoint, the date and time of the initiating request, geographic location of the caller (e.g., country, city, and/or state, zip), session identifier, and/or the unique call ID, or other state properties of the communication. The request, more preferably, encapsulates all the state information of the call, but may alternatively include no state information or partial state information. The state information from the initiated communication session is preferably sent via HTTP POST in the request body, HTTP GET in the request URI, HTTP header parameters to mimic the data flow of a web browser, or by any combination or suitable alternative way. A communication application is preferably retrieved prior to establishing a communication session between the at least two endpoints. Alternatively, the communication session may, at least initially, be routed to the appropriate destination for a basic communication session, such as providing simple SIP trunking.

The instructions of the communication application can be processed in establishing media communication of the communication session. The communication platform and more preferably a communication router can convert the instructions of a communication application (e.g., server response) into communication actions or executable operations during the communication session. The communication instructions/actions for voice-based communication sessions may include, for example, playing a pre-recorded sound file at a server-specified URI (such as a static mp3 file located at http://demo.example.com/myapp/1234.mp3), reading text to the caller using text-to-speech technology, calling another number (such as creating a new voice connection through the PSTN, SIP/VoIP, or other IP technology system), collecting digits via DTMF input, recording voice response audio, TTY or other inputs, transcribing spoken words to text, sending an SMS/MMS message, putting a call on hold, ending a call, transferring a communication to another endpoint (e.g., other SIP-based devices, PSTN devices, or other suitable destinations), and/or any suitable combination or sequence of these or other suitable actions. The communication instructions may be any suitable instructions customized to the particular medium of communication such as video, text/media messaging, screen-sharing session, multi-user application session, or any suitable medium of communication. In the variations, where at least one feature is specified in the SIP request, the communication platform may configure the communication request to use a subset of communication resources. For example, if the SIP request included a header that specified that the call should be recorded and not processed by an application, then the communication session may flow through a resource that provides recording capabilities. Similarly, if the SIP request is determined to be one for SIP trunking, the SIP communication session may be established using basic resources for the communication session (e.g., not processing with an application stack).

Block S230, which includes registering a callback resource to a signaling event, functions to associate, instantiate, or create a webhook, resource, or event handler reactive to the communication session. Block S230 is preferably substantially similar to block S130 described above. The registration of a callback resource preferably includes receiving a specified callback URI to associate with communication events. The callback resource may be set for an account, for a sub-account, for an endpoint, for a particular pattern of communication sessions, for a particular instance of communication (e.g., for the specific outgoing communication session) or for any particular categorization of communication sessions. A unique callback resource can be specified for a specific event. A callback resource can be registered through an account routing configuration. In this variation, all calls to an endpoint would have the callback resource registered. A callback resource may additionally or alternatively be registered in response to header field or embedded parameter included in a signaling message. Such registration may require authentication parameters to verify that the registration can be authenticated on behalf of the corresponding account. For example, once a call is connected to an account SIP phone through an IP PBX of the account holder, the account holder could inject header parameters in a signaling message (e.g., an INFO signal) that registers a new or updated callback resource and includes signed tokens to verify that the request comes from the account holder. A callback resource can additionally or alternatively be registered through an API request or through any suitable mechanism.

Block S240 and S250, which include inspecting communication signaling messages of the communication session and detecting the signaling message type in the communication signaling messages of the communication session, function to process signaling and media transactions or the communication session. Applied to SIP trunking applications, blocks S240 and S250 can include monitoring SIP transactional messages. SIP transactional messages can be used to interact with evented resources such that SIP initiated communication sessions can be treated as request/response communications. Block S260, which includes triggering the callback resource upon detecting the signaling message type, functions to notify, message, or signal to a callback resource that an event has occurred. Triggering the callback resource preferably includes making an application layer communication to an external resource specified by the callback resource. Blocks S240, S250, and S260 can operate substantially similar to blocks S140, S150, and S160.

3. Registering Session Initiation Protocol Endpoints

Figure 16:
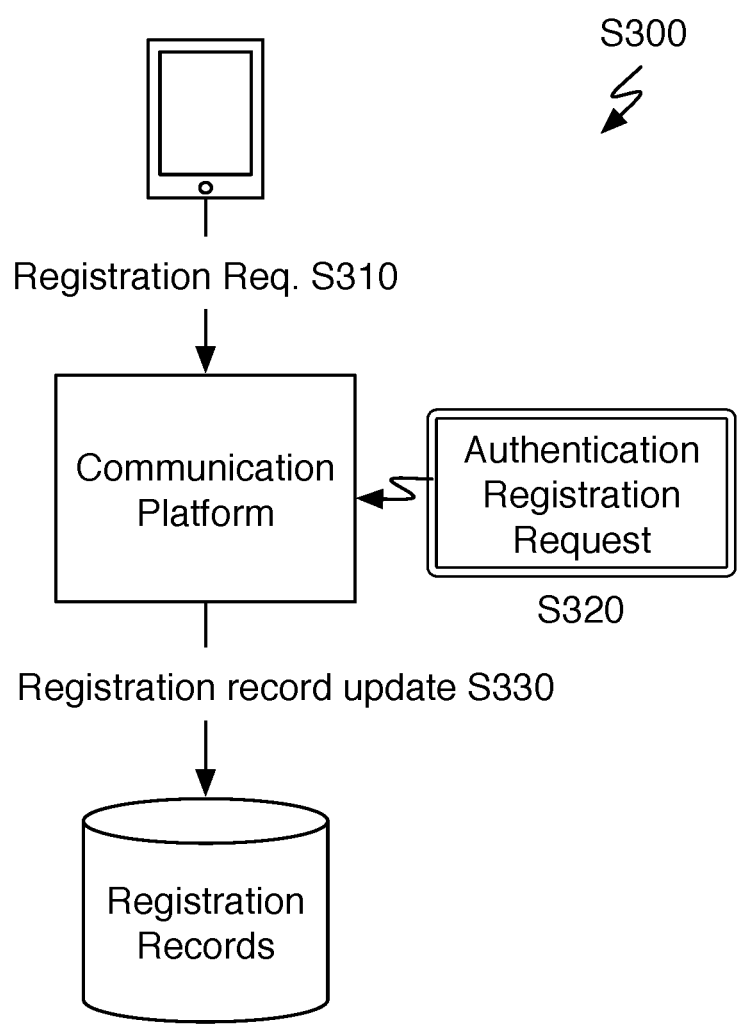
FIG. 16 is a schematic representation of a method for registering a SIP endpoint of a preferred embodiment.
Figure 17:
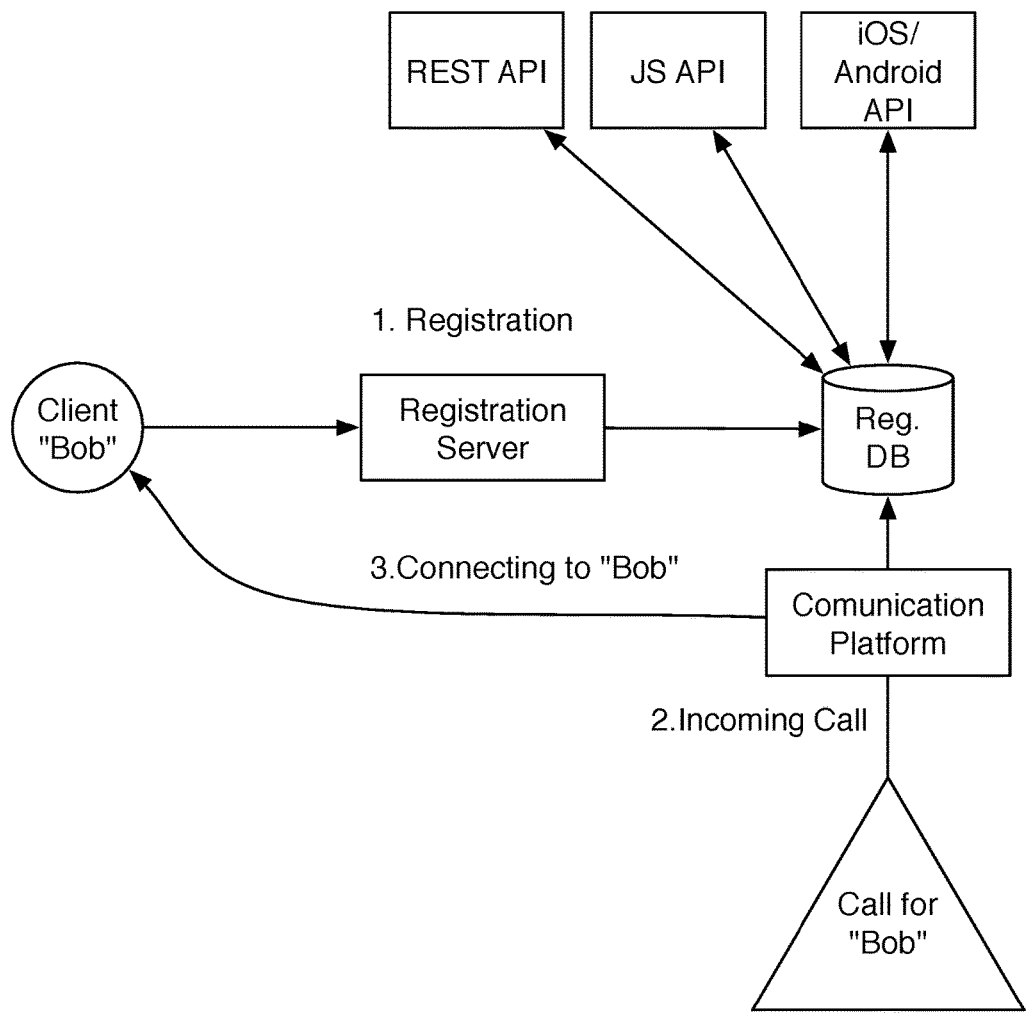
FIG. 17 is a schematic representation of an implementation of a method for registering a SIP endpoint of a preferred embodiment.

As shown in FIG. 16, a method S300 for integrating session initiation protocol in a telecommunications platform of a third preferred embodiment can include receiving a SIP endpoint registration request S310, authenticating the registration request S320, and updating a registration record according to the registration request S330. The method S300 of the third preferred embodiment functions to register SIP endpoints to use the communication platform as a registrar for addresses of SIP communication. The method of registering SIP endpoints may be used in any suitable combination or variation of the methods described herein. A SIP device or application is preferably configured to register as a SIP endpoint of the communication platform. The communication platform preferably receives registration requests from the device or application and updates a maintained registration record so that the device can participate in communication sessions as shown in FIG. 17. The authentication of registration requests can provide a layer of security in the namespace of SIP endpoint registration. Additionally, the authentication of registration requests can be used in expanding the ways endpoints are registered.

Block S310, which includes receiving a SIP endpoint registration request, functions to obtain a notification for a registration update of at least one SIP endpoint on the communication platform. The registration request is preferably to add a new SIP endpoint, update an existing SIP endpoint, or remove an existing SIP endpoint. The registration request may originate from a device requesting to be registered. For example a SIP-based phone may be registered. As another example, a client device may use an application to register. The registration request may alternatively be transmitted over an API, submitted through an administrator user interface, or received from any suitable source.

The registration request preferably specifies a namespace identity and a device identity. The namespace identity preferably includes a communication platform identity (e.g., an account id) and a domain name. The communication platform identity is preferably an account identifier that functions as an account denormalizer. The communication platform identity may alternatively be a username, account secure id, sub-account id, or any suitable identifier for an entity of the communication platform. The communication platform identity may additionally include an application identifier. The domain name preferably conforms to DNS routing. The DNS is preferably configured to route SIP communication to that domain to the communication platform. For example, the namespace identity may be example123@example.com, where example123 refers to a particular account and example.com is used as the domain name in routing SIP requests. In one variation, accounts of the communication platform may be allowed to use a predefined domain name space. In another variation, accounts may be able to use any suitable verified domain. Verifying a domain may include receiving DNS configuration for a domain, accessing a verification signature at specified location of the domain (e.g., retrieving a text document with a verification signature from the root of the domain), using an authentication callback of the domain, completing an authentication process with the domain (e.g., oauth), or completing any suitable authentication process. Additionally, the domain registration techniques may be extended to using outside account systems for registering a namespace identity such as completing oauth authentication to use a social network identity as the namespace identity. The device identity preferably includes the IP address and port to contact the device, but any suitable addressing scheme may alternatively be used. A registered device may additionally be configured with a preferred transport such as TLS, UDP, SCTP, WebSocket, TCP, or any suitable protocol, but the use of DNS may also resolve the preferred transport.

Block S320, which includes authenticating the registration request, functions to add a layer of security prior to changing any records. As mentioned the communication platform is preferably a multitenant platform managing multiple accounts. Authenticating the registration request preferably verifies the identity of the request. The authentication may be used in authenticating that the changes to the registration records of the communication platform are allowed. A received registration request is preferably authenticated prior to updating registration records. In one variation, a device is preferably configured with an authentication token that is passed to the communication platform along with the registration request. The communication platform, upon receipt of the authentication token, preferably verifies the token for the registration request. If the authentication token is deemed valid, the registration request is processed.

Preferably, an outside service may be queried for permission. For example, a callback URI may be expected for at least a subset of domains. The callback URI may be based on the domain name of the namespace identifier in the request. The callback URI may alternatively be preconfigured, registered, or mapped by the communication platform to use a particular authentication technique. An authentication request is preferably transmitted to the callback URI along with at least a subset of information from the registration request. The outside resource will preferably perform any suitable authentication and then respond indicating if the registration request is allowed or denied. A preferred embodiment may employ the use of a callback URI to authenticate any suitable SIP communication (in addition to or in place of authenticating registration).

In one preferred implementation, authentication of the request may use a policy engine that functions to provide authentication for connection requests. The policy engine preferably authenticates a registration request from the client prior to completing the registration. The policy engine is preferably used in the authentication process of a preferred embodiment in a manner substantially similar to the authentication approach described in U.S. patent application Ser. No. 13/478,495 filed 23 May 2012, herein incorporated in its entirety by this reference. The policy engine preferably authenticates the request by using a token associated with the client and analyzing a signed client communication from the client. If the client communication satisfies the authentication, a preferred embodiment preferably adds or updates the registration in response to client authentication at the policy engine. If the client communication fails to satisfy the authentication, an error may be logged and any suitable error response may be taken. Preferably, the token is sent from the client. In one variation, the client has an embedded token from when an application was instantiated. In another variation, a communication can be made to an authentication application to retrieve a token. Alternatively, a client identifier is sent to a policy engine that has an authentication application authenticate the credentials of the client identifier. Similarly, a SIP backend authentication may alternatively be used. The authentication may occur for registration and/or outbound communications. The token preferably includes an application ID and any additional parameters. The contents of a token are preferably signed with a secret key. A policy engine preferably completes authentication of the token before allowing a registration to complete. A policy engine preferably mediates the call out requests and authenticates any tokens, and may additionally verify permissions associated with application identifiers. Any suitable alternative forms of authentication may alternatively or additionally be integrated into the method. Such security measures may additionally or alternatively be used in authentication and/or authorization for other methods and systems of preferred embodiments described herein.

The authentication may additionally or alternatively be in place to authorize that the request has legitimate permissions to use the included credentials. For example, if the registration request specifies a namespace with an outside domain name, the communication platform preferably verifies that the requester has permissions to use that outside domain. Verifying outside permissions may additionally result in updating or requesting updates in outside services such as making DNS changes. Permissions may additionally be authorized. Permissions may determine the actions allowed by the registered device. The numbers that can be called from that number or the numbers that can call in to the registered device may be limited. The modes of communication such as a messaging, voice sessions, video sessions, screen sharing sessions, application sessions, or other modes of communication may be set in the permissions. In one variation, a device may be limited to registration only and receiving calls. Any suitable permissions may be applied to a device.

Block S330, which includes updating a registration record according to the registration request, functions to add, augment, or remove registration records from the communication platform. The registration records are preferably stored in an accessible registration database. Routing tables and/or any suitable routing data or models may additionally be maintained such that inbound and/or outbound communication sessions can be established for the registered devices. In one use case, updating a registration record includes adding a device registration to the registration records. In another use case, updating a registration record includes editing information of an existing device registration. For example, the IP address may need to be updated for a registered device when the device changes to a different wife network. The device will preferably transmit a new registration request to update the new IP address. In another use case, updating a registration record includes removing, deleting, or deactivating a registered device from the registration records. Any suitable update may alternatively be made. In one variation, multiple devices may be configured for a single endpoint. The multiple devices may be configured for any suitable cooperative use. In one example, multiple devices are prioritized so that if the highest priority device is not answered then the next highest priority device is called.

The method may additionally include routing inbound communication according to the registration record. An inbound communication may be received over any suitable mode of communication. The mode of communication may include messages, voice sessions, video sessions, screen sharing sessions, application sessions, or any suitable mode of communication. The inbound communication is preferably a SIP communication, but the inbound communication may have been initiated from any suitable protocol such as PSTN. Upon receiving an inbound communication, the registration database is queried to find the appropriate registration record. The registration record will preferably map a communication platform identifier (e.g., account identifier) to a device identity (e.g., a current IP address of the device). The inbound may simply specify the communication platform identifier to connect to the proper registered device. Additionally or alternatively, the inbound communication may specify a telephony endpoint such as a telephony number or short code, a username, or any alternative identifier. The communication platform preferably includes a database record mapping the alternative identifier to at least the communication platform identifier. For example, if the inbound communication specifies a phone number, that number is preferably mapped to an account identifier and then subsequently mapped through the registration database to a current IP address of the device.

Additionally, the method for registering SIP endpoints may include providing access to the registration data. Information from the registration database can preferably be accessed through an API. The registration database may be accessed through a REST API, a client interface (e.g., a JavaScript frontend interface), a device SDK interface (e.g., iOS or Android SDK interface), and/or any suitable interface. The interface can preferably be used to programmatically interact with the registration, see who and what devices are registered, see who is online, history of registration, duration of registration, location of registration, the permissions of registered users (e.g., who is registered to call a particular endpoint) and/or any suitable property of registration. The data in the registration database is preferably associated with at least one account, sub-account, or application id. Requests submitted through the interface preferably authenticate so that the permissions to access the requested registration information can be authorized.

4. Method for Transitioning Between SIP Operational Modes

Figure 18:
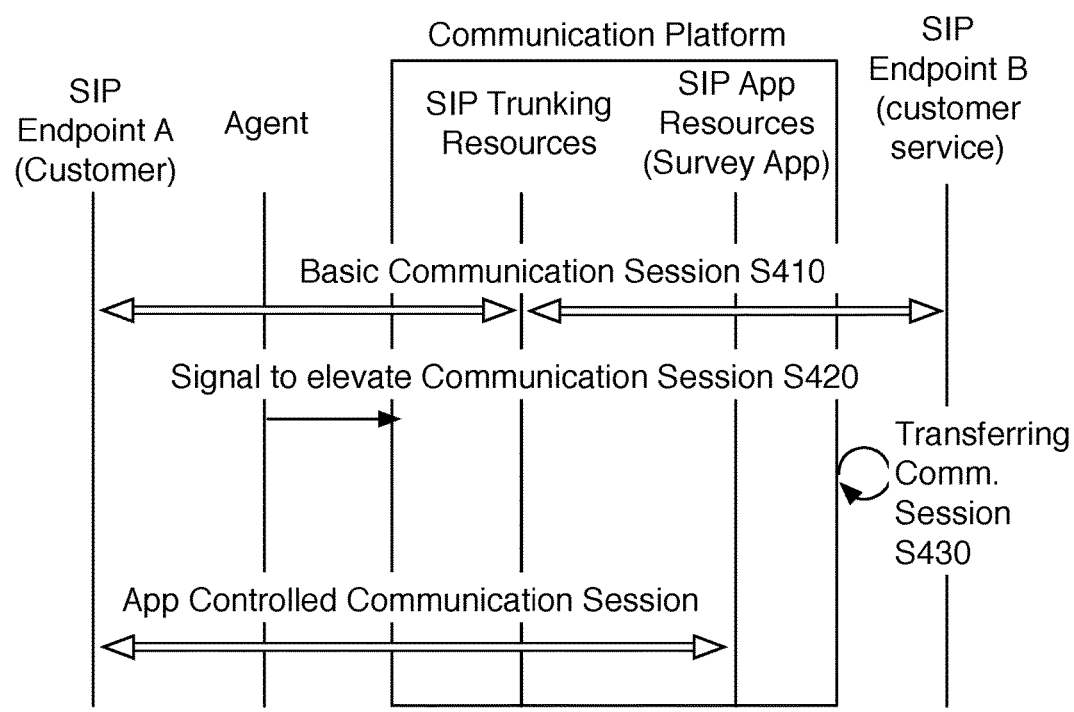
FIGS. 18 and 19 are sequence flow diagrams of methods for transitioning communication modes of a preferred embodiment.
Figure 19:
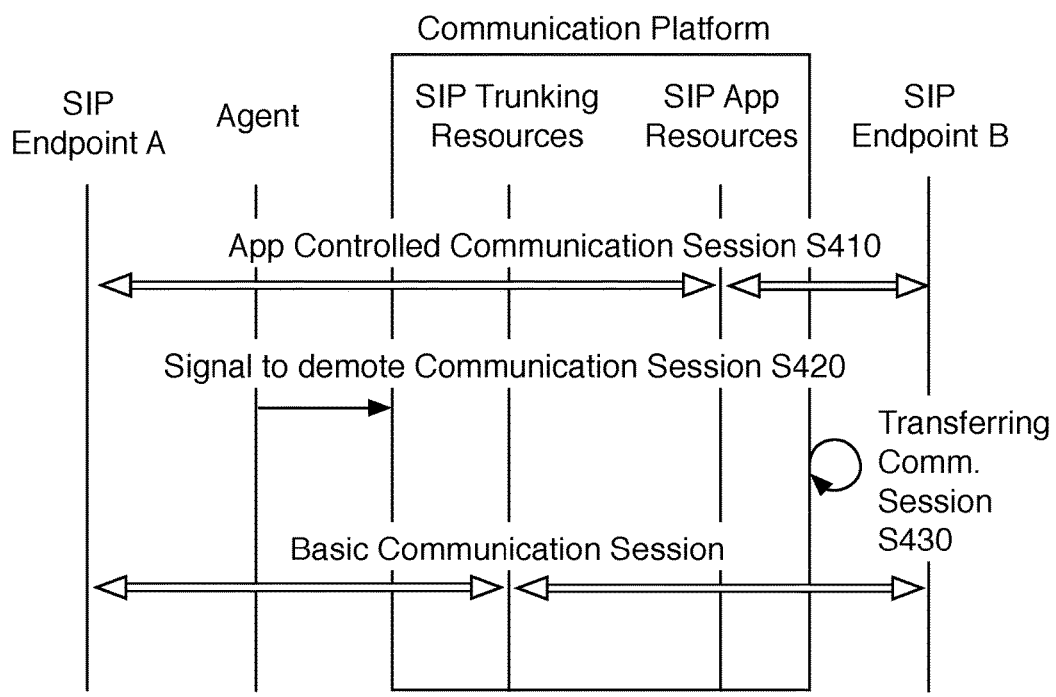

As shown in FIGS. 18 and 19, a method S400 for transitioning between SIP operational modes of a preferred embodiment can include establishing SIP communication session in a first mode S410, receiving a transition signal S420 and altering the operational mode of the communication session S430, which functions to change the resources used in processing the communication session. The variation preferably functions to enable basic SIP communication sessions (e.g., SIP trunking communication sessions) to be elevated to a communication processed by the application stack of the communication platform as shown in FIG. 18. Similarly, the variation may be used to demote a communication session using application/processing resources to use less or basic communication sessions as shown in FIG. 19. The operational modes thus preferably include a basic communication mode and an application stack communication mode, but any alternative operational mode may be used. In one variation, an operational mode may be defined for a particular feature or set of features of the application mode. For example, an operational mode may exist that routes the call through call recording resources. The basic communication mode is preferably used when a call or communication session is established from SIP trunking. The communication platform preferably established the SIP communication session, which is ran through a SIP proxy of the communication platform. The application stack communication mode is preferably used when a communication router uses a retrieved communication application when processing a communication. When in an application stack communication mode, the SIP session preferably has full application capabilities. An application can preferably modify state of the SIP session and perform actions such as redirect the call, hang-up, record a conversation, transcribe a conversation, send an message (e.g., SMS, MMS, application message), merge the call, and/or to perform any suitable action.

Figure 20A:
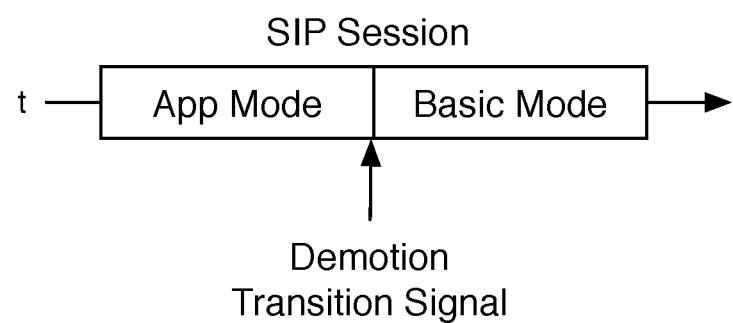
FIGS. 20A-20D are schematic timeline representations of promoting and demoting a communication session.
Figure 20B:
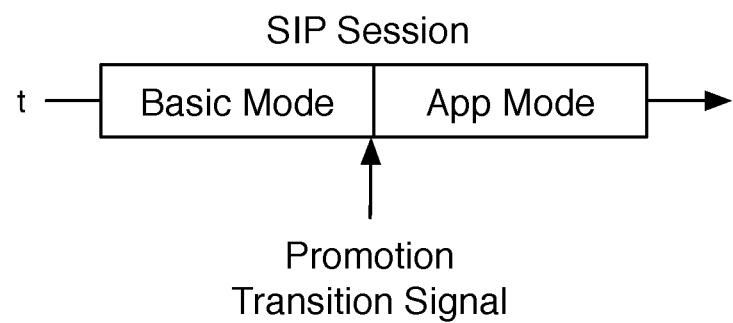
Figure 20C:
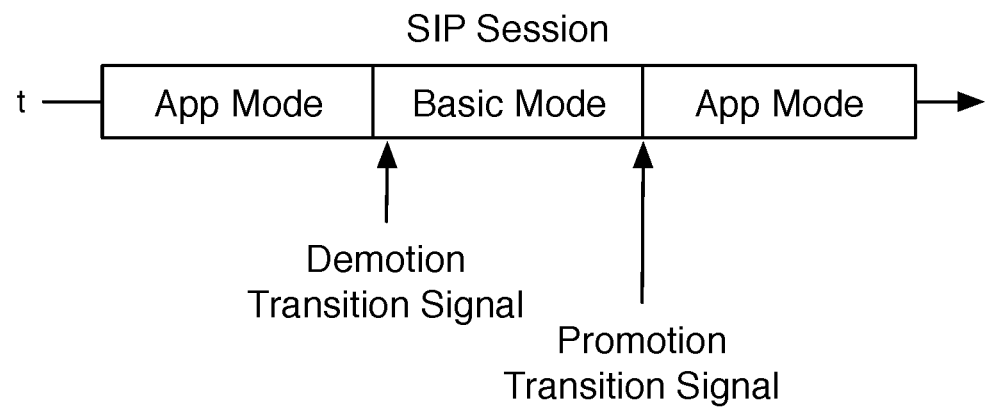
Figure 20D:
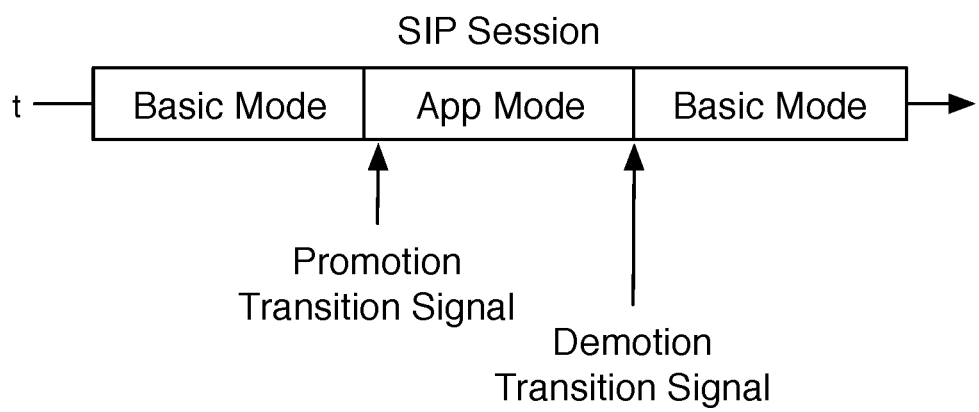

Step S410, which includes establishing SIP communication session in a first mode, functions to establish either a communication session in a basic, application, or another alternative communication mode. The method may be used to promote or demote the SIP communication mode. Additionally, modes may be changed any suitable number of times. As shown in FIG. 20A, a basic SIP communication mode may be promoted to use the capabilities of an application communication mode. As shown in FIG. 20B, a SIP session in an application communication mode may be demoted to forgo the application capabilities and operate in the basic SIP communication mode. As illustrated in FIGS. 20C and 20D, the communication mode may switch multiple times. The established SIP communication is preferably established in a manner substantially similar to the methods described above, but the SIP session may alternatively be established in any suitable manner.

Step S420, which includes receiving a transition signal, functions to obtain or identify a trigger to change modes of SIP communication. The transition signal may be received at any suitable point. The transition signal is preferably established and triggered through the programmatic features discussed above in methods S100 and S200. In one variation, the transition signal may be communicated in a SIP message. Either party may be able to trigger the altering of the operational mode of the communication session. Preferably, the SIP signaling may include an application ID, an authentication token, and/or any other credentials to specify how to transition the communication (e.g., which app to give control to and indicate the request is authentic and/or authorized). The transition signal may alternatively be submitted through an API request (preferably a REST API request). The REST API preferably has a resource in which the SIP session may be accessed and acted upon. The REST API preferably specifies the new mode of operation and, in the case of promoting the communication to an application communication mode, the REST API request may specify parameters for what application should initially control state. In yet another variation, a callback URI may be registered for a communication session and/or an endpoint so that the action may be triggered based on the SIP messages. For example, a callback may be registered for a basic SIP communication session so upon one of the endpoints hanging up the other endpoint is changed to an application communication mode with a pre-specified application. When the communication session mode is an application communication mode, an instruction of the application may trigger the change in the operational mode, essentially ending the application control of that application.

Step S430, which includes altering the operational mode of the communication session, functions to update the communication platform to use the appropriate resources to manage the communication session. When in a basic communication mode, the communication session is preferably routed through a SIP proxy. When in an application communication mode, the communication session is preferably routed through at least a communication router where at least a portion of an application is performed. When transitioning to the application communication mode, the steps associated with initiating a communication session with the communication platform are preferably performed in a substantially consistent manner. In one variation, if the communication is returning to the application communication mode for a second time, the communication router may remember at least partial state within the processing of application instructions. For example, if an application transfers the call to a basic mode, and then the call is returned to the application, the instructions after the initial transfer may be performed without having to retrieve new application instructions.

The method S400 is preferably used in combination with the methods S100 and S200 described above. Various signaling and media management approaches can be applied to achieve transitioning between operating modes. Altering the operational mode preferably includes onboarding new media and signaling resources into the session when upgrading an operational mode off boarding signaling and media resources of the session when downgrading, and/or otherwise modifying the set of signaling and media resources when transitioning.

Figure 21:
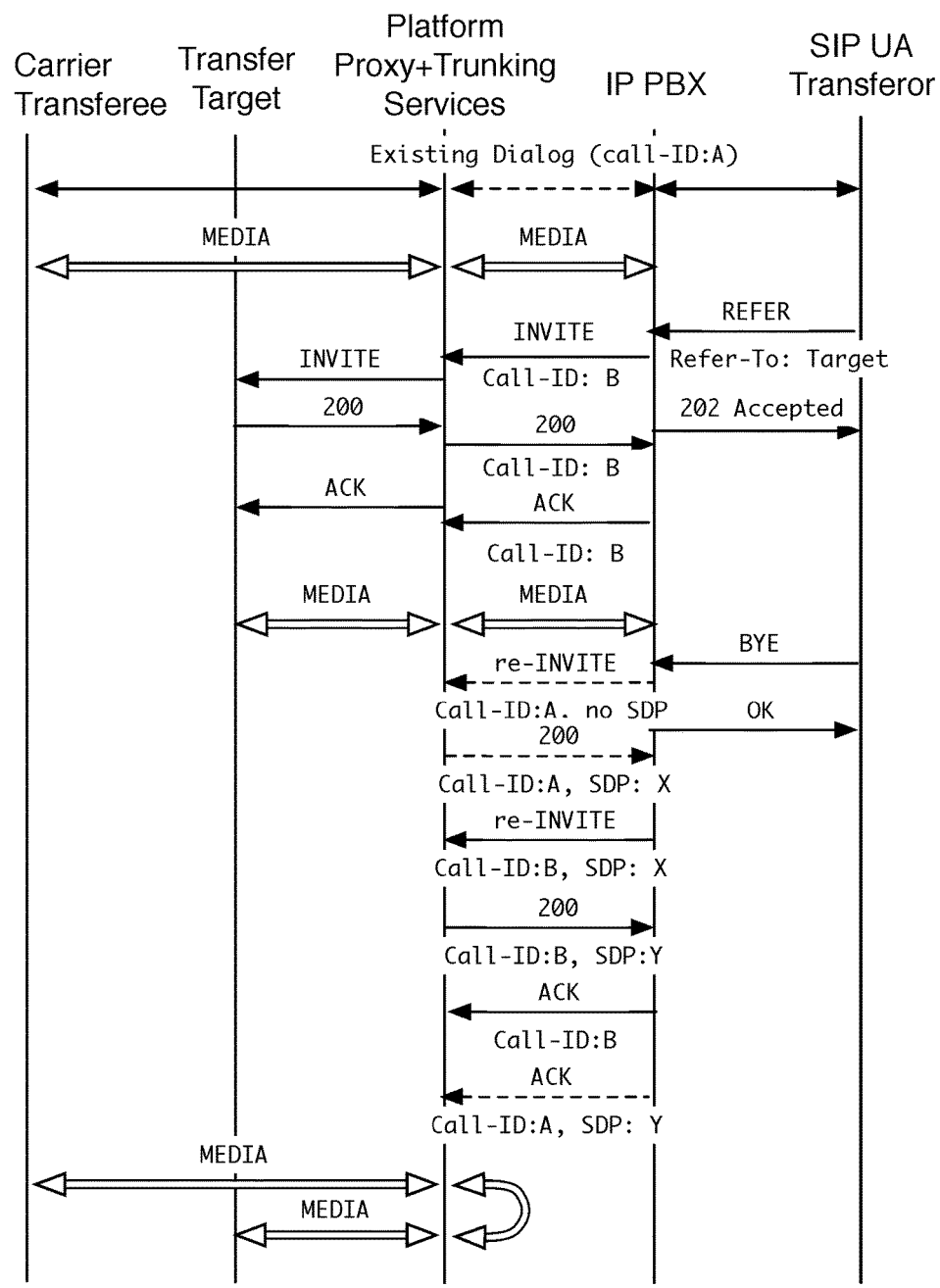
FIG. 21 is a sequence flow diagram of one variation of a call transfer upgrade.
Figure 22:
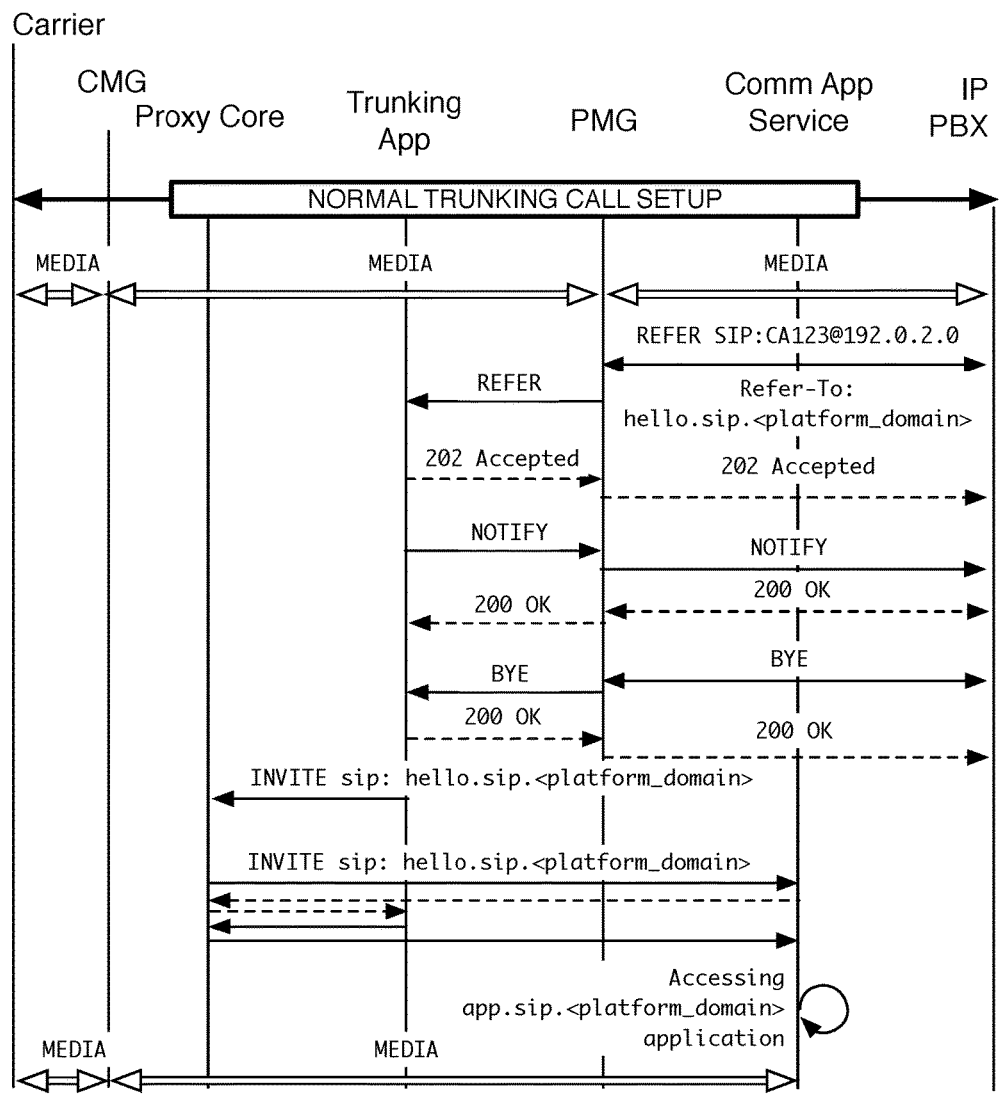
Figure 23:
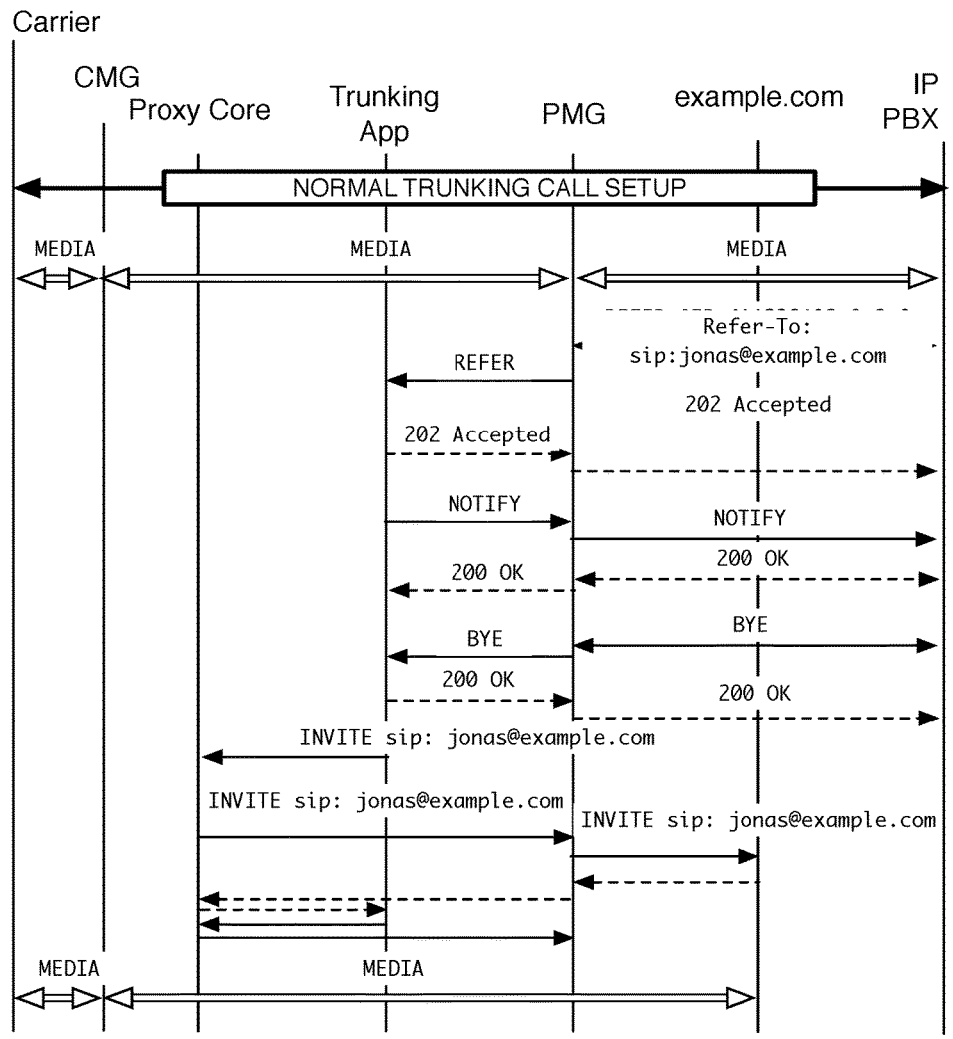
FIG. 23 is a sequence flow diagram of one variation of upgrading a basic communication through a REFER to a public-SIP-out.
Figure 24:
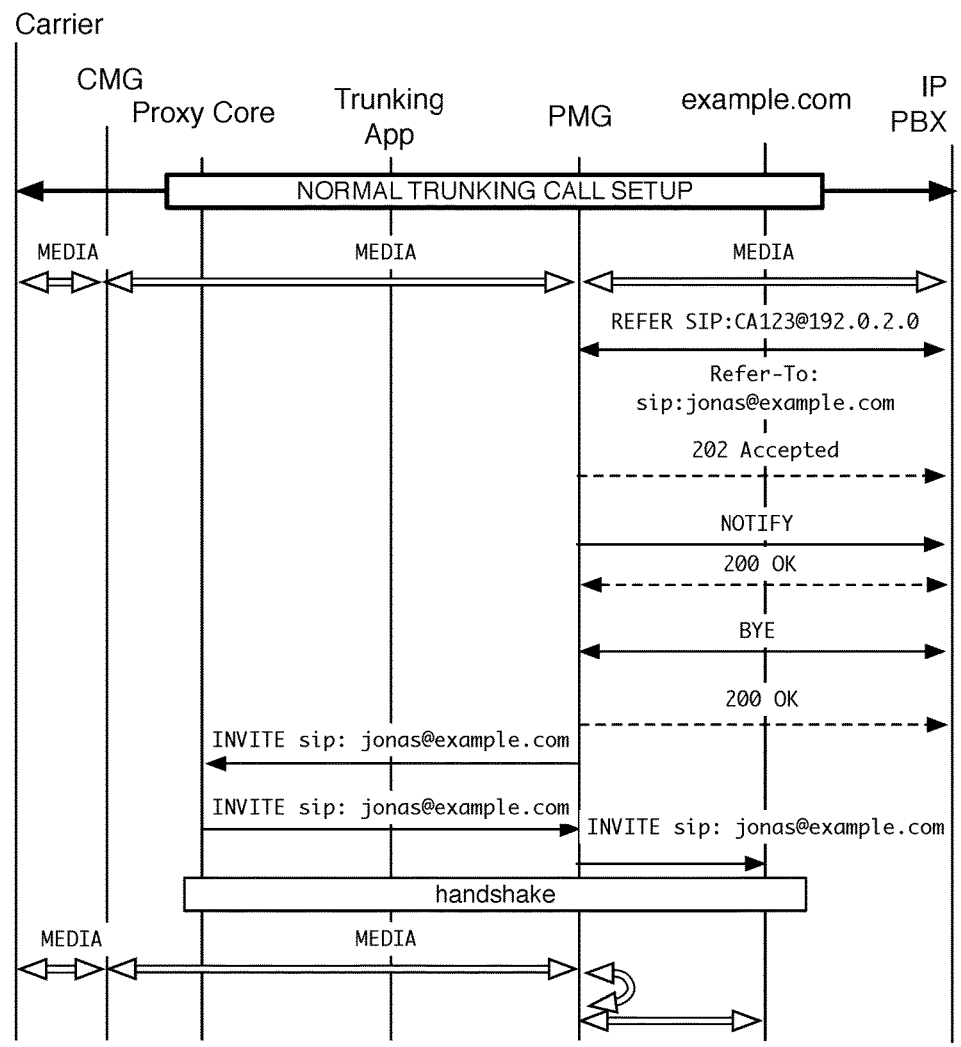
FIG. 24 is a sequence flow diagram of one variation of upgrading a basic communication through a REFER handled through an edge service.

As shown in FIG. 21, a SIP re-INVITE mechanism can be employed to upgrade or alternatively transfer a session. An existing signaling dialog can exist between a transferee (the entity that experiences the transition), the communication platform, an IP PBX and a SIP user agent. As shown in FIG. 21, the user agent can initiate the transfer. Alternatively the transfer may be initiated through an API, triggering of a registered callback, or initiated through any suitable mechanism. A REFER signaling message can be delivered which prompts the invite of the specified referrer, the target. The target could be another carrier or could be a communication application service. By supporting a SIP REFER message, the communication platform may support allowing any endpoint, including carriers, to do various transfer scenarios, which can include upgrading to an application operating mode. As shown in FIG. 22, an alternative signaling and media handling process accepts a REFER message to transition to an application mode. The referrer will preferably specify a referring endpoint. An INVITE to the endpoint is processed through the proxy core. As shown in the example of FIG. 22, the endpoint can be an application identifier such that the media communication will flow from the carrier through the carrier-media-gateway and the communication application service. The signaling and media flow can similarly use REFER to transition to targeting an external domain as shown in FIG. 23. The trunking app can additionally monitor when the transition occurs and meter the associated account appropriately such that an account may be billed at one rate when in SIP trunking mode and a second rate when in application mode. In another variation, the REFER may be handled through an edge service as shown in FIG. 24 where the public media gateway (PMG) facilitates upgrading the operation mode. Similarly, handing the REFER transparently at the edges could enable users to REFER to anything at any time, such that if operating in an application mode, the session could transition to a SIP trunking mode.

In one exemplary implementation, a basic communication mode may be provided by the communication platform at one usage rate and an application communication mode provided at a second usage rate. SIP trunking can use basic communication where communication is preferably channeled between the communicating endpoints. Since facilitating the basic communication session requires fewer/cheaper resources, SIP trunking communication sessions may be offered to users for a lower price. An agent, application, or service can preferably submit a transition signal if an entity decides to dynamically change the basic communication to use features of an application or service of the communication platform. Upon transitioning to the elevated operational mode, the communication session may be charged at a higher price rate for use of the application resources. The transition signal is preferably received through an API request, but may alternatively be received through any suitable channel. The variation of transitioning the operational mode of a communication session may additionally or alternatively be used with the method of the second preferred embodiment or during any established communication session.

The altering of the SIP communication mode may have numerous applications. In one exemplary use-case, an agent may be connected to a customer representative through a SIP session. The account associated with the phone number of the customer representative is preferably charged the basic communication mode rate (e.g., $0.001/min). When the customer representative has finished, a transition signal is preferably received, and the customer is seamlessly transitioned to a SIP communication session in an application communication mode. With the full capabilities of the application stack, a customer survey application may collect feedback from the customer before ending the call. During this survey application portion, the account may be charged an application customer mode rate (e.g., $0.01/min). In this example, the account was able to easily add a survey application without significantly increasing the cost of basic SIP communication. The communication mode changes are preferably transparent to the customer. In another exemplary use-case, a customer may call an endpoint for a calling card service. The call preferably starts the communication session in an application communication mode. The customer enters the code, and specifies the destination they wish to call. The application then transfers them to the desired number. For the portion of the communication session with the desired endpoint, the communication session is preferably demoted to a basic communication session to benefit from a lower rate. The caller may additionally be transferred to an application communication mode at the end of the call for other application related services, such as reading the balance of the calling card and the option to call another number. The altering of the communication mode may be used in any suitable application.

The system and methods of the preferred embodiment and variations thereof can be embodied and/or implemented at least in part as a machine configured to receive a computer-readable medium storing computer-readable instructions. The instructions are preferably executed by computer-executable components preferably integrated with the communication platform. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

As a person skilled in the art will recognize from the previous detailed description and from the figures and claims, modifications and changes can be made to the preferred embodiments of the invention without departing from the scope of this invention defined in the following claims.

What is claimed is:

1. A method comprising: at a multi-tenant communication platform system that includes a SIP (Session Initiation Protocol) communication router and a callback engine:
   detecting, using the callback engine, a SIP signaling event message that is registered in association with a callback URI from a plurality of communicated SIP signaling event messages communicated for a SIP communication session of the SIP communication router, the plurality of communicated SIP signaling event messages including at least one of a SIP signaling event message provided by the communication router and a SIP signaling event message received by the communication router, the callback URI being registered for an account of the communication platform system, the callback URI being a URI of an application of an external system of an account holder of the account;

responsive to detection of the SIP signaling event message by the callback engine, providing an application layer request to the external system of the account holder, the application layer request specifying the callback URI.

2. The method of claim 1, further comprising, at the platform system and during the SIP communication session, responsive to a signaling message that includes a parameter defining the callback URI: authenticating tokens included in the signaling message; and verifying the account, wherein the callback URI is registered according to the parameter in the signaling message.

3. The method of claim 1, wherein the callback URI is registered responsive to a received application programming interface (API) communication that identifies the SIP communication session and specifies the callback URI.

4. The method of claim 1, wherein the registered SIP signaling event message indicates that media communication is ending.

5. The method of claim 4, wherein responsive to detection of the SIP signaling event message by the callback engine, the platform system enables a communication application mode.

6. The method of claim 5, further comprising, at the platform system, accounting usage by the account in an original communication mode and accounting usage in the communication application mode, wherein usage in the original communication mode is distinct from usage in the communication application mode.

7. The method of claim 5, further comprising, at the platform system, transitioning from the communication application mode to a basic communication mode.

8. The method of claim 1, further comprising, at the platform system, enabling media processing during the SIP communication session, wherein media processing includes selectively enabling media recording during the SIP communication session.

9. The method of claim 1, further comprising:

mapping a destination endpoint specified in an incoming communication signaling request to a primary account routing configuration;

in a case where the primary account routing configuration specifies a signaling endpoint, routing an invitation signal to the signaling endpoint and establishing media communication between an originating endpoint of the incoming communication request and the signaling endpoint; and in a case where the primary account routing configuration specifies an application resource identifier, retrieving an application specified by the application resource identifier and processing the application in directing media communication of the SIP communication session.

10. The method of claim 9, wherein the signaling endpoint includes metadata embedded in the endpoint, the method further comprising: routing the incoming communication signaling request to a signaling application module; at the signaling application module, coordinating signaling and media control according to the metadata.

11. The method of claim 9, further comprising:

mapping the destination endpoint to a secondary account routing configuration;

responsive to detection of an error event, establishing media communication of the SIP communication session according to the secondary account routing configuration.

12. A multi-tenant communication platform system comprising:

a SIP (Session Initiation Protocol) communication router; and a callback engine constructed to detect a SIP signaling event message that is registered in association with a callback URI from a plurality of communicated SIP signaling event messages communicated for a SIP communication session of the SIP communication router, the plurality of communicated SIP signaling event messages including at least one of a SIP signaling event message provided by the communication router and a SIP signaling event message received by the communication router, the callback URI being registered for an account of the communication platform system, the callback URI being a URI of an application of an external system of an account holder of the account, wherein responsive to detection of the SIP signaling event message by the callback engine, the communication platform system is constructed to provide an application layer request to the external system of the account holder, the application layer request specifying the callback URI.

13. The system of claim 12, wherein during the SIP communication session and responsive to a signaling message that includes a parameter defining the callback URI, the platform system is constructed to: authenticate tokens included in the signaling message; and verify the account, and wherein the callback URI is registered according to the parameter in the signaling message.

14. The system of claim 12, wherein the callback URI is registered responsive to a received application programming interface (API) communication that identifies the SIP communication session and specifies the callback URI.

15. The system of claim 12, wherein the registered SIP signaling event message indicates that media communication is ending.

16. The system of claim 15, wherein responsive to detection of the SIP signaling event message by the callback engine, the platform system is constructed to enable a communication application mode.

17. The system of claim 15, wherein the platform system is constructed to account usage by the account in an original communication mode and account usage in the communication application mode, wherein usage in the original communication mode is distinct from usage in the communication application mode.

18. The system of claim 15, wherein the platform system is constructed to transition from the communication application mode to a basic communication mode.

19. The system of claim 12, wherein the platform system is constructed to enable media processing during the SIP communication session, wherein media processing includes selectively enabling media recording during the SIP communication session.

20. The system of claim 12, wherein the platform system is constructed to:
  map a destination endpoint specified in an incoming communication signaling request to a primary account routing configuration;
  in a case where the primary account routing configuration specifies a signaling endpoint, route an invitation signal to the signaling endpoint and establish media communication between an originating endpoint of the incoming communication request and the signaling endpoint; and
  in a case where the primary account routing configuration specifies an application resource identifier, retrieve an application specified by the application resource identifier and process the application in directing media communication of the SIP communication session.

* * * * *

UNITED STATES PATENT AND TRADEMARK OFFICE
CERTIFICATE OF CORRECTION

PATENT NO. : 10,051,011 B2
APPLICATION NO. : 15/005190
DATED : August 14, 2018
INVENTOR(S) : Boerjesson et al.

Page 1 of 1

It is certified that error appears in the above-identified patent and that said Letters Patent is hereby corrected as shown below:

On the Title Page

In Column 2, under "Foreign Patent Documents", Line 2, delete "3282126" and insert --0282126-- therefor Signed and Sealed this
Fourteenth Day of April, 2020

Andrei Iancu
*Director of the United States Patent and Trademark Office*